United States Patent
Ushiyama

(10) Patent No.: US 9,531,984 B2
(45) Date of Patent: Dec. 27, 2016

(54) TERMINAL DEVICE, INFORMATION PROCESSING DEVICE, AND COMPUTER-READABLE MEDIUM

(71) Applicant: Brother Kogyo Kabushiki Kaisha, Nagoya-shi, Aichi-ken (JP)

(72) Inventor: Kentaro Ushiyama, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/833,743

(22) Filed: Aug. 24, 2015

(65) Prior Publication Data

US 2015/0365622 A1    Dec. 17, 2015

Related U.S. Application Data

(63) Continuation-in-part of application No. PCT/JP2014/054297, filed on Feb. 24, 2014.

(30) Foreign Application Priority Data

Feb. 27, 2013   (JP) .................................. 2013-037495

(51) Int. Cl.
   *H04N 21/431* (2011.01)
   *H04N 5/765* (2006.01)
   (Continued)

(52) U.S. Cl.
   CPC ............ *H04N 5/765* (2013.01); *H04N 9/8211* (2013.01); *H04N 21/2743* (2013.01);
   (Continued)

(58) Field of Classification Search
   CPC ........ H04N 21/84; H04N 21/431; H04N 5/45; H04N 5/85; H04N 5/44591; G11B 27/34; G11B 27/36
   See application file for complete search history.

(56) References Cited

U.S. PATENT DOCUMENTS 8,279,282 B2 * 10/2012 Inagaki ............... G06F 3/04812
                                              348/157
2013/0223537 A1    8/2013 Kasai et al.

FOREIGN PATENT DOCUMENTS

JP    2000-132673 A    5/2000
JP    2000-156845 A    6/2000
(Continued)

OTHER PUBLICATIONS

Sep. 11, 2015—(WO) IPRP—App PCT/JP2014/054297.
(Continued)

*Primary Examiner* — Huy T Nguyen
(74) *Attorney, Agent, or Firm* — Banner & Witcoff, Ltd.

(57) ABSTRACT

A terminal device including a controller configured to display a video on a display in accordance with a display range, the video being configured such that its display range to be displayed on the display within a corresponding one of image frames constituting the video is variable depending on each playback position of the video, accept an instruction to indicate a specified display range that is a partial display range within a corresponding one of image frames constituting the video displayed on the display, and acquire particular display range information indicating a particular display range that is within a predetermined distance from the specified display range within an image frame corresponding to a playback position at a moment when the instruction is accepted, from a storage device storing a plurality of pieces of display range information indicating display ranges to be displayed within respective image frames corresponding to playback positions.

11 Claims, 17 Drawing Sheets

(51) Int. Cl.
*H04N 9/82*         (2006.01)
*H04N 21/2743*      (2011.01)
*H04N 21/43*        (2011.01)
*H04N 21/845*       (2011.01)
*H04N 9/804*        (2006.01)

(52) U.S. Cl.
CPC ..... *H04N 21/4307* (2013.01); *H04N 21/4316* (2013.01); *H04N 21/845* (2013.01); *H04N 9/8042* (2013.01)

(56) References Cited

FOREIGN PATENT DOCUMENTS

| | | |
|---|---|---|
| JP | 2003-153250 A | 5/2003 |
| JP | 2004-104556 A | 4/2004 |
| JP | 2009-124516 A | 6/2009 |
| WO | 2012/039404 A1 | 3/2012 |

OTHER PUBLICATIONS

May 27, 2014—(WO) Written Opinion—App PCT/JP2014/054297.
Aug. 25, 2015—(JP) Notification of Reasons for Rejection—App 2013-037495.
May 27, 2014—International Search Report—Intl App PCT/JP2014/054297.

\* cited by examiner

LAYER 1

1k×1k=1M PIXELS

LAYER 2

2k×2k=4M PIXELS

LAYER 3

4k×4k=16M PIXELS

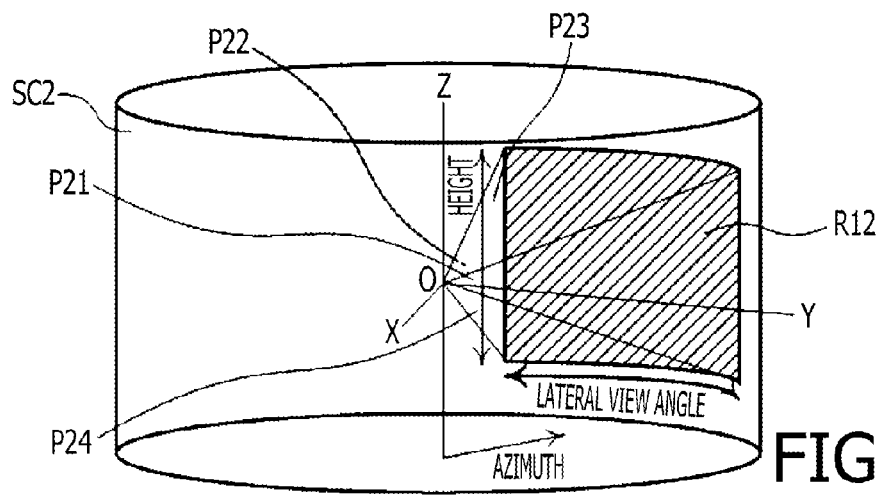
FIG. 4B
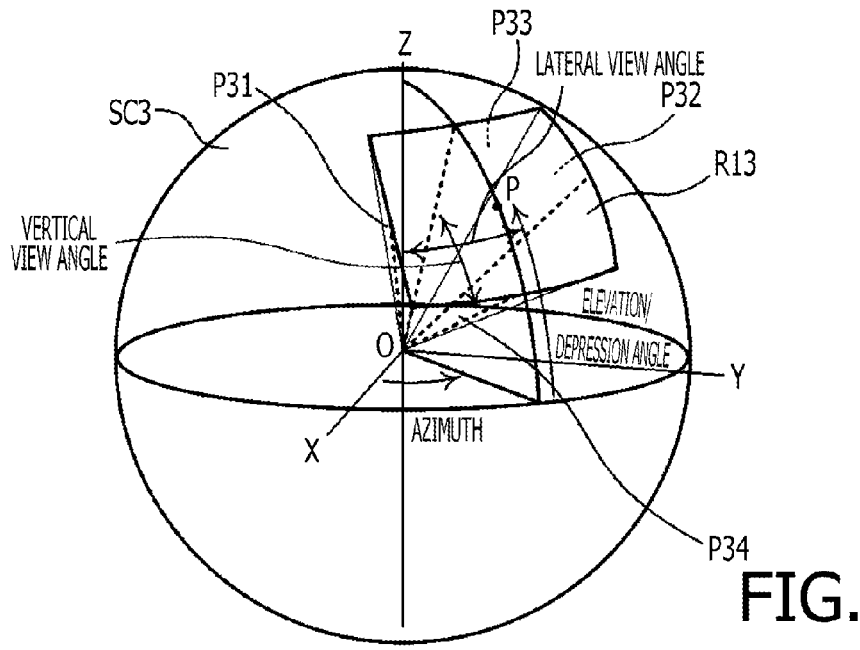
FIG. 4C
| PLAYBACK POSITION (ms) | X-COORDINATE | Y-COORDINATE | WIDTH | HEIGHT |
|---|---|---|---|---|
| 0 | X0 | Y0 | W0 | H0 |
| 16 | X1 | Y1 | W1 | H1 |
| 33 | X2 | Y2 | W2 | H2 |
| 49 | X3 | Y3 | W3 | H3 |
| ⋮ | ⋮ | ⋮ | ⋮ | ⋮ |
FIG. 5A

| PLAYBACK POSITION (ms) | AZIMUTH | LATERAL VIEW ANGLE | HEIGHT |
|---|---|---|---|
| 0 | A0 | VA0 | VH0 |
| 16 | A1 | VA1 | VH1 |
| 33 | A2 | VA2 | VH2 |
| 49 | A3 | VA3 | VH3 |
| ⋮ | ⋮ | ⋮ | ⋮ |

FIG. 5B

| PLAYBACK POSITION (ms) | AZIMUTH | ELEVATION/DEPRESSION ANGLE | LATERAL VIEW ANGLE | VERTICAL VIEW ANGLE |
|---|---|---|---|---|
| 0 | DA0 | HA0 | HVA0 | WVA0 |
| 16 | DA1 | HA1 | HVA1 | WVA1 |
| 33 | DA2 | HA2 | HVA2 | WVA2 |
| 49 | DA3 | HA3 | HVA3 | WVA3 |
| ⋮ | ⋮ | ⋮ | ⋮ | ⋮ |

FIG. 5C

ACQUISITION TARGET LIST

| PRIORITY ORDER | BLOCK NUMBER OF DATA BLOCK |
|---|---|
| 1 | block1_audio |
| 2 | block2_audio |
| 3 | block1_video_layer1 |
| 4 | block2_video_layer1 |
| 5 | block1_video_layer2_part2 |
| 6 | block1_video_layer2_part4 |
| 7 | block2_video_layer2_part1 |
| 8 | block2_video_layer2_part2 |

FIG. 7B

TERMINAL DEVICE, INFORMATION PROCESSING DEVICE, AND COMPUTER-READABLE MEDIUM

CROSS-REFERENCE TO RELATED APPLICATION

This is a Continuation-in-Part of International Application No. PCT/JP2014/054297 filed on Feb. 24, 2014, which claims priority from Japanese Patent Application No. 2013-037495 filed on Feb. 27, 2013. The entire disclosure of the prior application is incorporated herein by reference.

BACKGROUND

Technical Field

The present disclosure relates to a technical field of terminal devices for displaying videos.

Related Art

So far, a video sharing site has been known that distributes, by streaming, video data uploaded to a server via the Internet, in response to a distribution request from a terminal device. The video data distributed by streaming from the video sharing site is, for example, displayed on a window screen of a browser of the terminal device. At this time, there is a case where a representative still image included in video data associated with the streaming-distributed video data is displayed on the window screen. With this still image, it is possible to recommend the video data associated with the streaming-distributed video data to a user of the terminal device.

On the other hand, a system has been known that a user delivers edited data indicating information such as playback positions of video data to other users by email so as to recommend specific scenes in the video data to the other users. Thereby, the user who created the edited data is allowed to promptly show the other users the specific scenes in the video data.

SUMMARY

Meanwhile, there is a case where a user performs a pseudo camera work for a video such as a panoramic video. In the pseudo camera work, for example, by indicating conditions such as a camera angle and a wideness of visual field of a virtual camera via an operation unit, display ranges for a plurality of image frames constituting the video are specified. Recently, there is a need for uploading camera work data indicating a pseudo camera work to a server and providing the camera work data to other users. In this case, it is anticipated that a pseudo camera work performed by another user for a video being displayed on a terminal device may be recommended to a user of the terminal device. However, the pseudo camera work is characterized by time-series movement of display ranges for a plurality of image frames constituting the video. Therefore, it is difficult to comprehensibly convey features of the pseudo camera work to the user by a still image as used in the known technique. Furthermore, even if the technique disclosed in the patent document 1 is applied, it is difficult to comprehensibly convey the features of the pseudo camera work to the user. Moreover, for example, it is anticipated that camera work data indicating a pseudo camera work performed by each of a plurality of users may be uploaded to the server. In this case, a method has not been known for determining an appropriate camera work to be recommended to a user, from among each pseudo camera work corresponding to each piece of the camera work data.

Aspects of the present disclosure are advantageous to provide one or more improved techniques, for a terminal device, which make it possible to provide an appropriate camera work to be recommended to a user.

According to aspects of the present disclosure, a terminal device is provided that includes a display and a controller configured to display a video on the display in accordance with a display range, the video being configured such that the display range thereof to be displayed on the display within a corresponding one of image frames constituting the video is variable depending on each playback position of the video, accept an instruction to indicate a specified display range that is a partial display range within a corresponding one of image frames constituting the video displayed on the display, and acquire particular display range information indicating a particular display range that is within a predetermined distance from the specified display range within an image frame corresponding to a playback position at a point of time when the instruction is accepted, from a storage device storing a plurality of pieces of display range information indicating display ranges to be displayed on the display within respective image frames corresponding to a plurality of playback positions.

According to aspects of the present disclosure, further provided is an information processing device connectable to a storage device storing a plurality of pieces of display range information of a video, each of the plurality of pieces of display range information indicating a display range to be displayed on a display within a corresponding one of image frames corresponding to a plurality of playback position of the video, the display range being variable depending on each playback position of the video, the information processing device including a communication unit and a controller configured to acquire, from a terminal device via the communication unit, display range information indicating a specified display range that is a partial display range within an image frame corresponding to a playback position at a point of time when an instruction to indicate the specified display range is accepted, the specified display range being the partial display range specified within the image frame of image frames constituting a video displayed by the terminal device, acquire, from the storage device, particular display range information indicating a particular display range that is within a predetermined distance from the display range indicated by the acquired display range information, and transmit, to the terminal device via the communication unit, the particular display range information to the terminal device.

According to aspects of the present disclosure, further provided is a non-transitory computer-readable medium storing computer-readable instructions configured to, when executed by a processor, cause the processor to display a video on a display in accordance with a display range, the video being configured such that the display range thereof to be displayed on the display within a corresponding one of image frames constituting the video is variable depending on each playback position of the video, accept an instruction to indicate a specified display range that is a partial display range within a corresponding one of image frames constituting the video displayed on the display, and acquire particular display range information indicating a particular display range that is within a predetermined distance from the specified display range within an image frame corresponding to a playback position at a point of time when the instruction is accepted, from a storage device storing a plurality of pieces of display range information indicating display ranges to be displayed on the display within respective image frames corresponding to a plurality of playback positions.

BRIEF DESCRIPTION OF THE ACCOMPANYING DRAWINGS

FIG. 1 schematically exemplifies a configuration of a communication system S of an illustrative embodiment.

FIG. 4B shows an exemplary virtual screen and an exemplary display range on the virtual screen.

FIG. 4C shows an exemplary virtual screen and an exemplary display range on the virtual screen.

FIG. 5A is an example of a piece of camera work data generated by a controller 21.

FIG. 5B is an example of a piece of the camera work data generated by the controller 21.

FIG. 5C is an example of a piece of the camera work data generated by the controller 21.

FIG. 7B shows an exemplary content of an acquisition target list generated by a data group priority order determination process.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

[1. Overview of Configuration and Operations of Communication System S]

Figure 1:
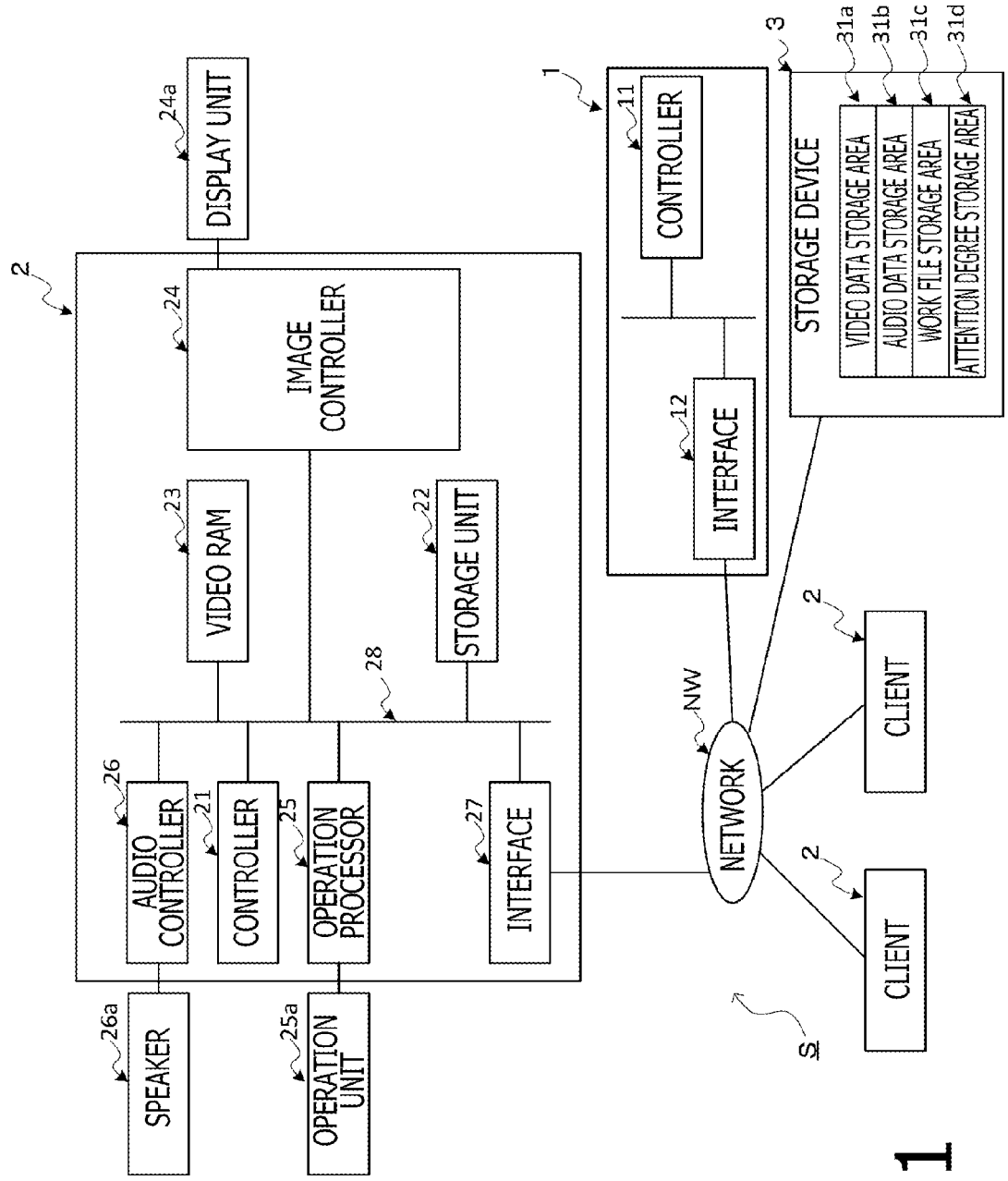

Firstly, an overview of a configuration and operations of a communication system of the illustrative embodiment will be described with reference to FIG. 1. FIG. 1 schematically exemplifies a configuration of a communication system S of the illustrative embodiment. As shown in FIG. 1, the communication system S includes a distribution server 1 and a plurality of client 2. Furthermore, the distribution server 1 and the client 2 are communicable via a network NW. For example, the network NW is constituted of the Internet or the like.

The distribution server 1 accepts, for example, an upload of a content or camera work data of the content from the client 2. For example, the distribution server 1 sends the content to the client 2 in response to a content request from the client 2. The content includes video data. The video data is data specifying a video in which display range displayed by a display is variable depending on each playback position. Such video includes a panoramic video. The panoramic video is, for example, a video in which an object is shot with a camera having a high resolution and equipped with a lens which is capable of capturing a wide range. The lens which is capable of capturing a wide range includes a wide lens, a fish-eye lens, a 360-degree lens and the like. The playback position is a time elapsed since the beginning of playback of the video data. It is noted that the content may include audio data. Transmission of the content is carried out, for example, by streaming distribution via the network NW. The client 2 receives the content distributed from the distribution server 1 by streaming.

Furthermore, the distribution server 1 sends, for example, camera work data of the content to the client 2 in response to a camera work request from the client 2. The display range corresponds to a drawing area, in one image frame, to be drawn in a screen of the display. In other words, the display range is a range which is cut out from a captured range defined by the image frame. Such display range is indicated, for example, by a pseudo camera work (hereinafter referred to as a "pseudo camera work"). Suppose, for instance, that the image frame constituting a video is projected on a virtual screen placed in a three-dimensional virtual space, and that there is a person who watches the video in the three-dimensional virtual space. For example, the pseudo camera work is an indication of at least one of a viewpoint position, a visual line direction and a visual field of the person who watches the video projected on the virtual screen. In other words, the pseudo camera work is an indication of an angle of a virtual camera or a wideness of a visual field. The virtual camera denotes a virtual camera that determines the drawing areas in the image frames constituting the video. The pseudo camera work may be reprised by the above-mentioned camera work data (hereinafter referred to as "pseudo camera work data"). One piece of pseudo camera work data does not necessarily indicates, for example, display ranges for all the image frames included in a playback time from the beginning till the end of playback of the video data. That is, there is a case where one piece of pseudo camera work data indicates display ranges for image frames included within a time range being a part of the playback time. For example, while receiving the content by streaming, the client 2 displays a video in accordance with display ranges indicated by the acquired pseudo camera work data.

The distribution server 1 is connectable to a storage device 3. For example, the storage device 3 includes a hard disc drive (HDD). The storage device 3 is provided to the distribution server 1. Alternatively, the storage device 3 may be provided to a server other than the distribution server 1. In the storage device 3, in response to a request from the client 2, data of a Web page to be sent to the client 2 is stored. Furthermore, a video data storage area 31a, an audio data storage area 31b, a work file storage area 31c and an attention degree storage area 31d are provided to the storage device 3.

In the video data storage area 31a, a plurality of pieces of video data are stored. The video data stored in the video data storage area 31a is allowed to be shared among a plurality of client 2 which are accessible to the distribution server 1. In the audio data storage area 31b, a plurality of pieces of audio data are stored. The audio data stored in the audio data storage area 31b is allowed to be shared among a plurality of client 2 which are accessible to the distribution server 1.

The video data stored in the video data storage area 31a may be a plurality of pieces of video data generated when a plurality of cameras take motion pictures of the same object from different angles, respectively, in synchronization with each other. Also, the video data may be a plurality of pieces of video data generated when a plurality of cameras take motion pictures of different objects, respectively, in synchronization with each other. An example of a plurality of pieces of video data is, for example, a piece of video data in which a person singing on a stage is shot and a piece of video data in which a person waiting at the back of the stage is shot. Furthermore, the video data may be a plurality of pieces of video data having different resolutions. In this case, for example, low resolution video data, middle resolution video data and high resolution video data are generated from one piece of video data. A low resolution video is played from the low resolution video data. A middle resolution video is played from the middle resolution video data. A high resolution video is played from the high resolution video data. The low resolution video will be hereinafter referred to as a video of a layer 1. The middle resolution video will be hereinafter referred to as a video of a layer 2. The high resolution video will be hereinafter referred to as a video of a layer 3. In the illustrative embodiment, three layers from the layer 1 to the layer 3 are exemplified, but the number of layers to be applied is not limited to three. Furthermore, for example, image frames constituting the video of the layer 2 and image frames constituting the video of the layer 3 are each configured such that one whole image frame is divided into a plurality of frames.

Figure 2:
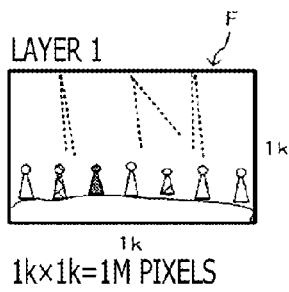
FIG. 2 shows one image frame constituting a video of each layer.
Figure 2:
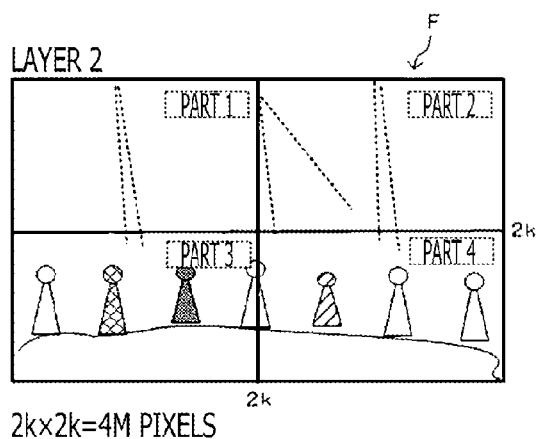
Figure 2:
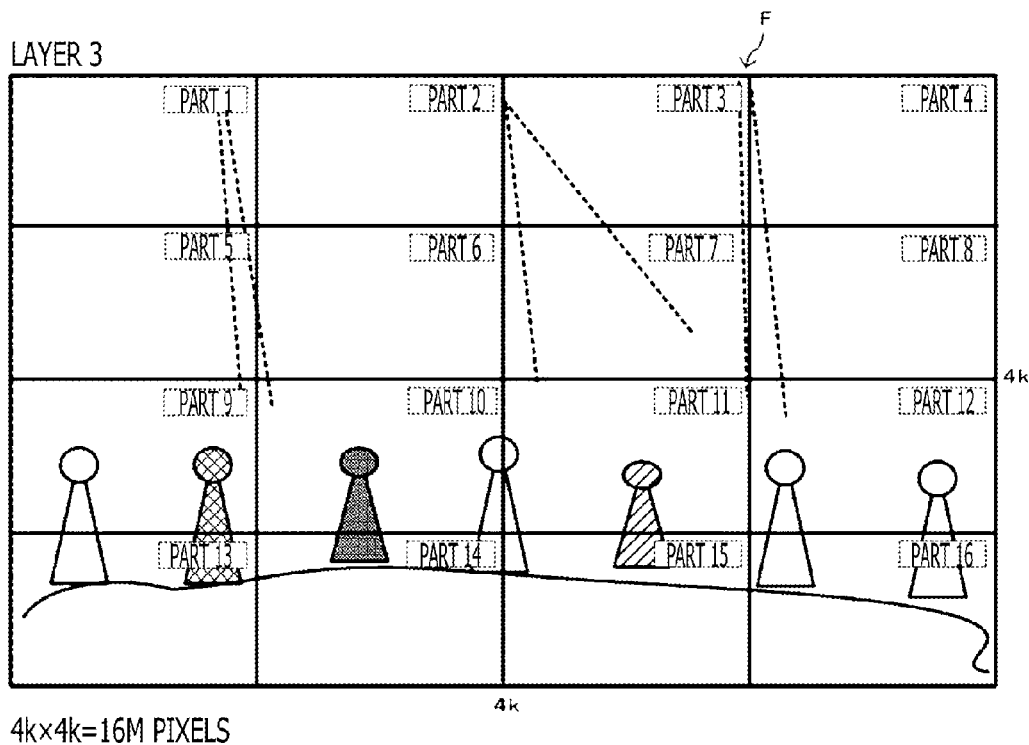

FIG. 2 shows one image frame constituting a video of each layer. In FIG. 2, the number of pixels per one image frame of the layer 1 is 1M (Mega) pixels. In addition, the number of pixels per one image frame of the layer 2 is 4M pixels. Further, the number of pixels per one image frame of the layer 3 is 16M pixels. Meanwhile, in the example shown in FIG. 2, the image frame of the layer 2 is divided into four equal parts. That is, four image frames from part 1 to part 4 are obtained from one image frame of the layer 2. Such divided image frames will be referred to as "segmented image frames." On the other hand, one image frame of the layer 3 is divided into 16 equal parts. The number of pixels for one segmented image frame divided in this manner is 1M pixels. That is, in the example shown in FIG. 2, the number of pixels in each of the segmented image frames in the layer 2 and the layer 3 is the same as that of the image frame of the layer 1. Furthermore, the division of the image frame is carried out for each of a plurality of image frames constituting the video and having different playback positions of the video. Then, for each part mentioned above, a plurality of segmented image frames are packed to generate video data. This video data will be referred to as "segmented video data." In the example shown in FIG. 2, for the video of the layer 2, four pieces of segmented video data are generated. That is, the video data of the video of the layer 2 is composed of four pieces of segmented video data. On the other hand, for the video of the layer 3, 16 pieces of segmented video data are generated. Each piece of segmented video data generated in this manner is, for example, compressed in a predetermined format such as MPEG. On the other hand, for the layer 1 shown in FIG. 2, the video data in which the image frames are not divided is compressed in the predetermined format. It is noted that the image frames in the video of the layer 1 may be divided as well. Furthermore, although the example shown in FIG. 2 is configured such that the image frame is divided into a reticular pattern, the image frame may be divided into different shapes. Furthermore, in the example shown in FIG. 2, the image frame is divided to equalize the entire area of every segmented image frame in the same layer, but the image frame may be divided to unequalize the entire area of every segmented image frame in the same layer. It is noted that the video data for each part may be generated by the distribution server for by a server different from the distribution server 1.

Then, in the work file storage area 31c, each of work files are stored in association with a corresponding one of contents. For example, each work file stores information such as a title of content, information indicating features of a pseudo camera work, and pseudo camera work data. For example, a work ID for identifying a work file is assigned to the work file. The information indicating features of the pseudo camera work includes, for example, a name or explanation of an object or a scene displayed on the screen by the pseudo camera work. The title of the content and the information indicating features of the pseudo camera work are used to search for the pseudo camera work data. The scene denotes a range indicating a section of a certain action in a video. Such a scene includes, for example, a scene in which a singer is singing, a scene in which an actor is acting, or a scene showing a state of an event. It is noted that the work file may include a content ID for identifying a content. The work file stored in the work file storage area 31c includes, for example, a work file uploaded by the client 2. There is a case where a plurality of work files are associated to one content. For example, a plurality of pieces of pseudo camera work data, indicating display ranges respectively specified by pseudo camera works performed by a plurality of users, are associated to a certain content.

Meanwhile, as shown in FIG. 1, the distribution server 1 includes a controller 11 and an interface 12. The controller 11 includes a CPU, a ROM, and a RAM. The controller 11 controls transmissions or receptions of contents, and transmissions or receptions of pseudo camera work data. In the above-mentioned streaming distribution, for example, the controller 11 generates a video stream for each piece of video data on the basis of the video data. The video stream includes a plurality of video data groups. Each video data group is data generated by separating video data from a head position to an end position thereof on the basis of a predetermined time unit. Each video data group includes one or a plurality of image frames F. Furthermore, if audio data is included in the content, the distribution server 1 generates an audio stream for each piece of audio data on the basis of the audio data. The audio stream is composed of a plurality of audio data groups. Each audio data group is data generated by separating audio data from a head position to an end position thereof on the basis of a predetermined time unit. Then, the distribution server 1 sequentially sends the video data groups included in the generated video stream to the client 2. Furthermore, the distribution server 1 sequentially sends the audio data groups included in the generated audio stream to the client 2. Moreover, when receiving a request for pseudo camera work data from the client 2, the controller 11 determines pseudo camera work data to be sent to the client 2 in response to the request. The method for determining the pseudo camera work data to be sent to the client 2 will be described later.

Next, as shown in FIG. 1, the client 2 includes a controller 21, a storage unit 22, a video RAM 23, an image controller 24, an operation processor 25, an audio controller 26, an interface 27 and a bus 28. These components are connected to the bus 28. A display unit 24a provided with a display is connected to the image controller 24. An operation unit 25a is connected to the operation processor 25. The operation unit 25a includes, for example, a mouse, a keyboard, and a remote controller. A touch panel which serves as both the display unit 24a and the operation unit 25a may be applied. The controller 21 receives, via the operation processor 25, an operation instruction input by a user though the operation unit 25a. The user is allowed to perform operations of the above-mentioned pseudo camera work via the operation unit 25a. A speaker 26a is connected to the audio controller 26. The interface 27 is connected to a network NW.

The controller 21 includes a CPU, a ROM, and a RAM. The controller 21 is provided with timer function. The storage unit 22 includes, for example, a hard disc drive (HDD). In the storage unit 22, an OS (Operating System), a player software and the like are stored. The player software is a program for playback of contents. The player software includes a program of the present disclosure. It is noted that the player software may be downloaded from a predetermined server connected to the network NW. Alternatively, the player software may be stored in a recording medium and read in via a drive for the recording medium.

Figure 3:
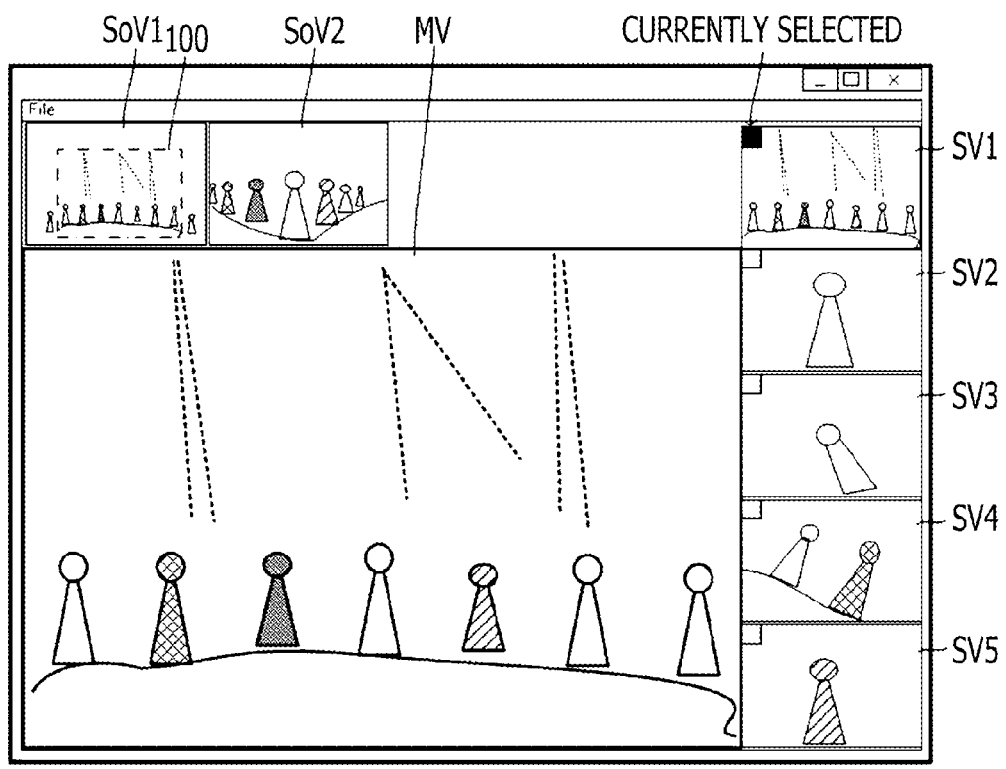
FIG. 3 shows exemplary main screen and sub screens.

The controller 21 functions as a player for playback of contents by executing a player software. The controller 21 sequentially acquires a content distributed by streaming from the distribution server 1 and plays back the content by executing the player software. On the display, a main view and a sub view are displayed by the function of the player. In the main view and the sub view, videos are displayed. Video data for the first video and video data for the second video may be identical to or different from each other. It is preferable that, for example, a plurality of sub views are displayed as thumbnail views. FIG. 3 shows exemplary main screen and sub screens. In the example shown in FIG. 3, one main view MV and five sub views SV1-SV5 are displayed. For example, the number of sub views is set in accordance with an area of the display. Also, in the example shown in FIG. 3, video data for a video displayed in the main view MV and video data for a video displayed in the sub views SV1-SV5 are the same. That is, the video displayed in the main view MV and the sub views SV1-SV5 are videos displayed by playing back the same video data. Furthermore, in the example shown in FIG. 3, two source views SoV1 and SoV2 are displayed. In the source views SoV1 and SoV2, the whole image frames F constituting respective video are displayed. For example, a video displayed in the source view SoV1 and a video displayed in the source view SoV2 are videos that are respectively shot with different cameras from different positions. In the example shown in FIG. 3, video data of the video displayed in the source view SoV1 is selected. Therefore, video data of the video displayed in the main view MV and the sub views SV1-SV5 are video data of the video displayed in the source view SoV1. Video data for the video is switchable by the controller 21, for example, in accordance with a video data selection instruction by the user.

Then, in the sub views SV1-SV5, videos are displayed in accordance with respective pseudo camera work data being different from each other. Therefore, features of pseudo camera works performed by other users for a video are allowed to be conveyed more comprehensibly to the user of the client 2 by the videos displayed in the sub views SV1-SV5 in accordance with respective pseudo camera work data. Furthermore, playback positions of the videos displayed in the sub views SV1-SV5 are the same. That is, image frames F which are displayed in the sub views SV1-SV5 are the same, but display ranges in the image frames F differ from each other. This means, for example, that conditions such as a camera angle and a wideness of visual field are different. Then, in the example shown in FIG. 3, the video displayed in the sub view SV1 is selected from among the videos displayed in the sub views SV1-SV5, and the selected video is displayed in the main view MV as well. It is noted that a video within a display frame 100 shown in the source view SoV1 is to be displayed in the sub view SV1 and the main view MV.

In response to a selection instruction to select one of the videos displayed in the sub views SV2-SV5, the controller 21 switches the video being displayed in the main view MV to the video selected by the selection instruction. Thereby, it is possible to comprehensively convey, to the user, the pseudo camera work for the selected video, in response to the selection instruction to select one of the videos displayed in the sub views SV2-SV5. It is noted that respective pieces of the video data to be displayed in the sub views SV1-SV5 may differ from each other. For example, as video data of videos to be displayed in the sub views SV1-SV3, the video data of the video displayed in the source view SoV1 is applied. On the other hand, as video data of videos to be displayed in the sub views SV4 and SV5, the video data of the video displayed in the source view SoV2 is applied. In this case, if, for example, the selection instruction to select the video displayed in the sub view SV4 is made in a state where, for example, the video displayed in the sub view SV1 is selected, video data of a video to be displayed in the main view MV will be switched from the video data of the video displayed in the source view SoV1 to the video data of the video displayed in the source view SoV2.

It is noted that, in the example shown in FIG. 3, the configuration in which one main view is displayed on the display has been shown. However, a plurality of main views may be displayed on the display.

A buffer memory is provided to a RAM of the controller 21. In the buffer memory, for example, video data and the like included in the content distributed from the distribution server 1 by streaming is temporarily stored. Also, in the buffer memory, for example, pseudo camera work data distributed from the distribution server 1 is temporarily stored. The controller 21 outputs video data from the buffer memory to a video RAM 23. In the video RAM 23, frame buffers are provided for storing drawing results for the main view MV, the sub views SV1-SV5, and the source views SoV1 and SoV2. For example, in each of drawing areas of the frame buffers corresponding to the main view MV and the sub views SV1-SV5, respectively, image data of a region that corresponds to a display range, within a corresponding one of image frames F constituting a video played back by video data, indicated by a respective piece of pseudo camera work data is written. Furthermore, in each of drawing areas of the frame buffers corresponding to the source views SoV1 and SoV2, respectively, image data that corresponds to a corresponding one of image frames F constituting a video played back by video data is written. The image controller 24 draws and displays the image data written in the frame buffers, in accordance with control signals form the controller 21. That is, while receiving video data by streaming, the controller 21 displays videos on the main view MV, the sub views SV1-SV5 and the source views SoV1 and SoV2 in accordance with display ranges indicated by the acquired pseudo camera work data. It is noted that, in the main view MV, in place of displaying a video in accordance with display ranges indicated by pseudo camera work data, there is also a case where a video is displayed in accordance with display ranges according to the user's pseudo camera work. Furthermore, when a video is displayed in the main view MV, in the sub views SV1-SV5, in place of displaying the videos in accordance with the display ranges indicated by respective piece of the pseudo camera work data, images (still images) of the display ranges indicated by each piece of the pseudo camera work data may be displayed. Moreover, for example, there is a case where a content from the distribution server 1 stored in the buffer memory includes audio data. In this case, the controller 21 plays back the audio data from the buffer memory and outputs to the audio controller 26. The audio controller 26 generates analog audio signals from the audio data and outputs the generated analog audio signals to the speaker 26a.

Furthermore, in response to an operation of the pseudo camera work by the user, the controller 21 accepts an instruction to specify a display range for displaying a part of an image frame F constituting a video being displayed in the main view MV. For example, the controller 21 accepts a change instruction to change the display range in the image frame F constituting the video being displayed in the main view MV. The controller 21 changes the display range displayed in the main view in accordance with the change instruction. In other words, the user is allowed to change the display range of the video displayed in the main view MV by changing at least one of the viewpoint position, the visual line direction and the visual field through the pseudo camera work operation. Suppose, for instance, that an image frame F constituting a video is projected on the virtual screen positioned in the three-dimensional virtual space, and that there is a person watching the video in the three-dimensional virtual space. The viewpoint position is a position where the person is watching the video. The visual line direction is a direction of the person's visual line with respect to the video. The visual field is, for example, a dimension of an area within a range of the person's vision on the virtual screen positioned in the three-dimensional virtual space. It is noted that the visual field may be set as the range of the person's vision. Then, by the pseudo camera work operation, the display range of the video on the virtual screen is determined. That is, an image within a range that is determined as the display range is cut out from the virtual screen, and the image being cut out is displayed in the main view MV.

Figure 4A:
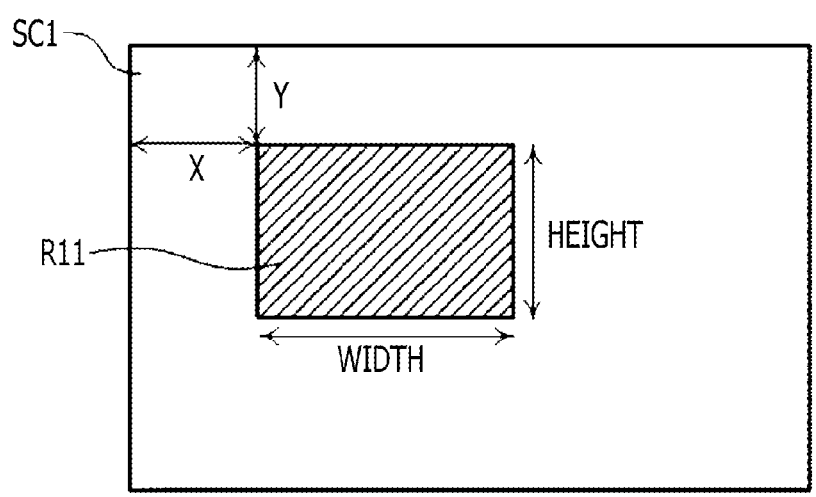
FIG. 4A shows an exemplary virtual screen and an exemplary display range on the virtual screen.

FIGS. 4A to 4C show exemplary virtual screens and exemplary display ranges on the virtual screens. In the example shown in FIG. 4A, a screen SC1 is defined as the virtual screen. The screen SC1 is a rectangular flat screen, and the video is projected on the rectangular flat surface. A display range R11 on the screen SC1 is, for example, defined by an X-coordinate, a Y-coordinate, a width and a height. For example, suppose that the upper left vertex of the screen SC1 is an origin of a coordinate system on the screen SC1. The X-coordinate and the Y-coordinate defines the viewpoint position. The X-coordinate is a coordinate of the upper left vertex of the display range R11 in the lateral direction, and the Y-coordinate is a coordinate of the upper left vertex of the display range R11 in the vertical direction. For example, in the three-dimensional virtual space, a point at a predetermined distance from the screen SC1 may be supposed to be the viewpoint. For example, suppose that a line which passes through the viewpoint and intersects with the screen SC1 at right angle is the visual line. A point where the visual line and the screen SC1 intersect is the center of the display range R11. A width and a height defines the visual field. The width and the height are a lateral length and a vertical length of the display range R11. The visual line direction is set in advance.

In the example shown in FIG. 4B, a screen SC2 is defined as the virtual screen. The screen SC2 is a cylindrical screen, and a video is projected on a side surface of the cylinder. On the screen SC2, for example, a cylindrical panoramic video is projected. The panoramic video is, for example, an omnidirectional image. The panoramic video may be a partially omnidirectional image having a view angle narrower than 360 degrees. A display range R12 on the screen SC2 is, for example, defined by an azimuth, a lateral view angle and a height. The azimuth defines the visual line direction. For example, a midpoint of a central axis of the cylinder of the screen SC2 is set as the view point. Furthermore, the view point is set as an origin of a coordinate system in the three-dimensional virtual space, and the central axis of the screen SC2 is set as Z-axis. X-axis passes through the origin and is perpendicular to Y-axis and Z-axis. Y-axis passes through the origin and is perpendicular to X-axis and Z-axis. The azimuth defines a direction of the visual line from the view point. The visual line is, for example, perpendicular to Z-axis. The azimuth is, for example, an angle between X-axis and the visual line. The lateral view angle and the height define the visual field. The lateral view angle is an angle indicating a range of the visual field in the lateral direction with the visual line direction at the center. The height is a vertical length of the display range R12. A square pyramid indicating the visual range in the three-dimensional virtual space is defined on the basis of the azimuth, the lateral view angle and the height. This square pyramid is a view volume. The view volume is a range to be a target of projection transformations. An actual view volume is a truncated square pyramid, but the square pyramid is used for the purpose of illustration. A vertex of the view volume is the view point, and the visual line passes through the center of the bottom face of the view volume. An angle between a side face P21 and a side face P22, among side faces P21-P24 of the view volume, which are parallel to the Z-axis is the lateral view angle. A lateral length of a face at which the view volume and the screen SC2 intersect is the height. Finally, a face at which the view volume and the screen SC2 intersect is the display range R12. The viewpoint position is set in advance.

In the example shown in FIG. 4C, a screen SC3 is defined as the virtual screen. The screen SC3 is a spherical screen, and a video is projected on a spherical surface. On the screen SC3, for example, a spherical panoramic video is projected. A display range R13 on the screen SC3 is, for example, defined by an azimuth, an elevation/depression angle, a lateral view angle and a vertical view angle. The azimuth and the elevation/depression angle define the visual line direction. In the three-dimensional virtual space, for example, a view point is positioned within a range surrounded by the screen SC3. For example, suppose that a center of the sphere of the screen SC3 is the viewpoint. Furthermore, suppose that the view point is an origin of a coordinate system in the three-dimensional virtual space, and that the vertical axis is Z-axis. X-axis passes through the origin and is perpendicular to Z-axis. Y-axis passes through the origin and is perpendicular to X-axis and Z-axis. The azimuth is, for example, an angle between the X-Z plane and the visual line. The elevation/depression angle is, for example, an angle between the X-Y plane and the visual line. The lateral view angle and the vertical view angle define the visual field. The lateral view angle is an angle indicating a range of the visual field in the lateral direction with the visual line direction at the center. The vertical view angle is an angle indicating a range of the visual field in the vertical direction with the visual line direction at the center. Suppose, for instance, that a line on the X-Y plane that passes through the origin and intersects with the visual line at right angle is a vertical rotational axis. Suppose, for instance, that a line that passes through the origin and intersects with the visual line and the vertical rotational axis at right angle is a lateral rotational axis. A square pyramid indicating the visual range in the three-dimensional virtual space is defined on the basis of the azimuth, the elevation/depression angle, the lateral view angle and the vertical view angle. This square pyramid is the view volume. A vertex of the view volume is the view point, and the visual line passes through the center of the bottom face of the view volume. An angle between a side face P31 and a side face P32, among side faces P31-P34 of the view volume, which are parallel to the Z-axis is the lateral view angle. An angle between the side face P33 and the side face P34 is the vertical view angle. Finally, a face at which the view volume and the screen SC3 intersect is the display range R13. The viewpoint position is set in advance. On the basis of the viewpoint position, the visual line direction and the visual field, three-dimensional coordinate of the display range on the virtual screen is transformed to two-dimensional coordinate by perspective transformation. With the transformed two-dimensional coordinate, for example, it is possible to determine which part in the image frame F constituting the panoramic video is within the display range. As the visual line direction changes due to a change of at least one of the azimuth and the elevation/depression angle, the display range R13 changes in accordance with the visual line direction. Furthermore, as the visual field changes due to a change of at least one of the vertical view angle and the lateral view angle, the display range R13 changes in accordance with the visual field. That is, the display range R13 is a range according to the visual line direction and the visual field. It is noted that, generally, any three-dimensional shape for the screen SC3 may be acceptable as far as it completely covers the viewpoint, and it may be, for example, a screen having cubic shape.

It is noted that, which virtual screen among the screens SC1-SC3 to use may be determined for example in accordance with a type of video data. For example, for a video other than panoramic videos, the screen SC1 may be determined; for the cylindrical panoramic video, the screen SC2 may be determined; and for the spherical panoramic video, the screen SC3 may be determined.

Furthermore, the controller 21 generates pseudo camera work data indicating the above-mentioned display range of the video displayed in the main view MV. FIGS. 5A to 5C show examples of pseudo camera work data generated by the controller 21. FIG. 5A shows an example of a case where the virtual screen is the rectangular screen SC1. FIG. 5B shows an example of a case where the virtual screen is the cylindrical screen SC2. FIG. 5C shows an example of a case where the virtual screen is the spherical screen SC3. It is noted that, in the example shown in FIG. 5A, for example, if the aspect ratio is determined to be 16:9, when one of the width or the height is fixed, the other is fixed. Therefore, it is sufficient for the pseudo camera work data to include either of the width or the height. In the examples shown in FIGS. 5A to 5C, pseudo camera work data indicating display ranges in the image frames F at each playback positions of 0 millisecond, 16 milliseconds, 33 milliseconds, 49 milliseconds and the like is shown. It is noted that 16 milliseconds is comparable with the refresh rate of the display (60 Hz).

[2. Operation of Communication System 5]

Next, operation of the communication system S will be described.

(2-1. Processes in Client 2)

Figure 6A:
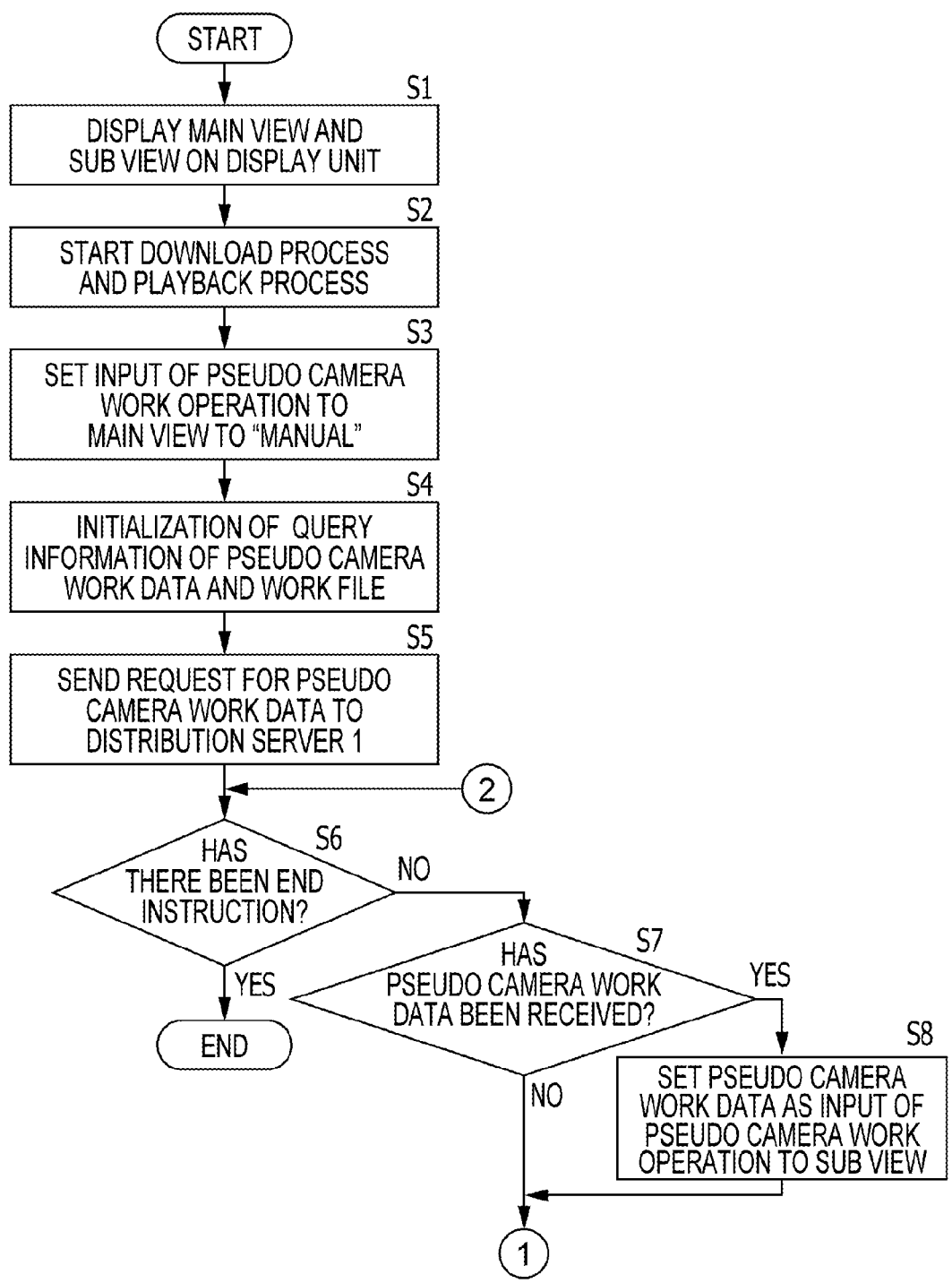
FIGS. 6A-6C are flow chart showing a main process executed by a controller 21 of a client 2.
Figure 6B:
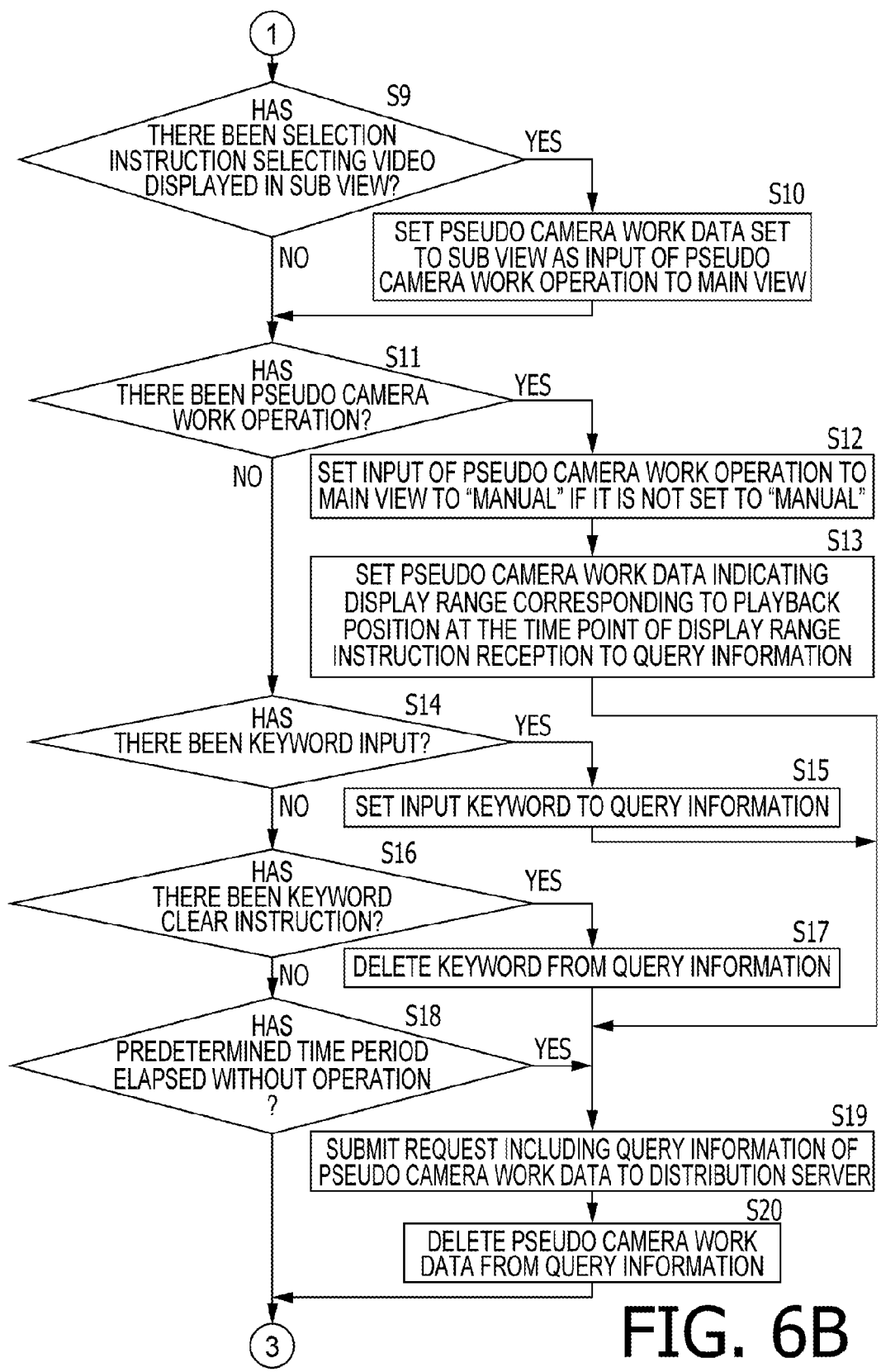
Figure 6C:
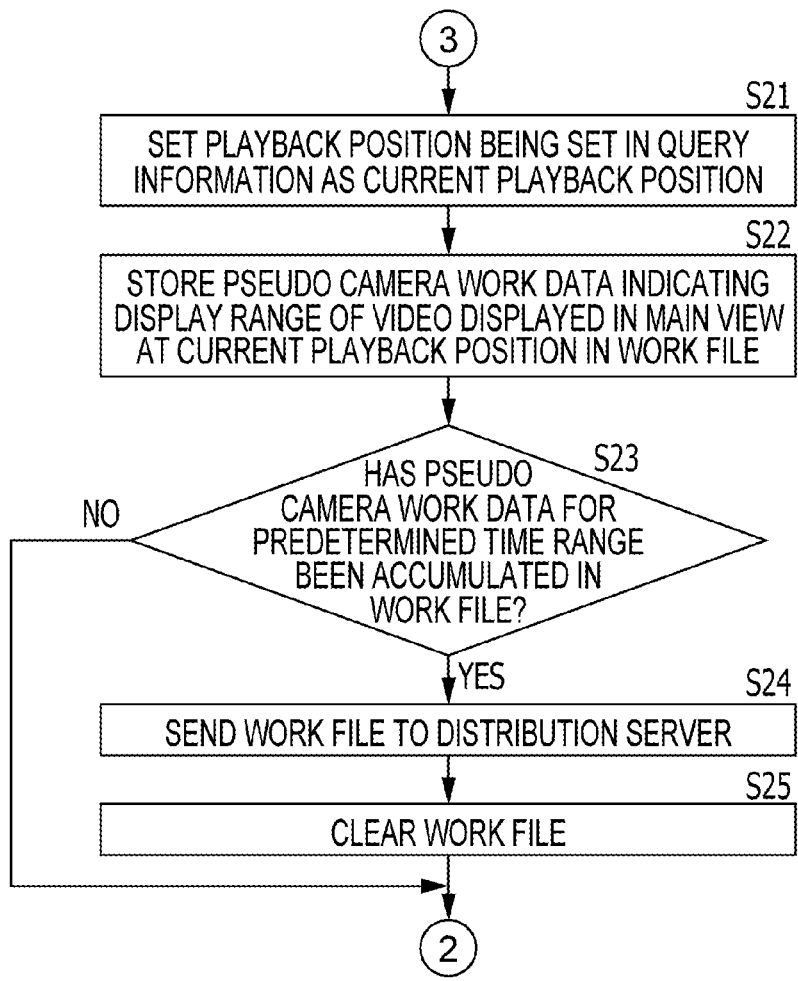
Figure 7A:
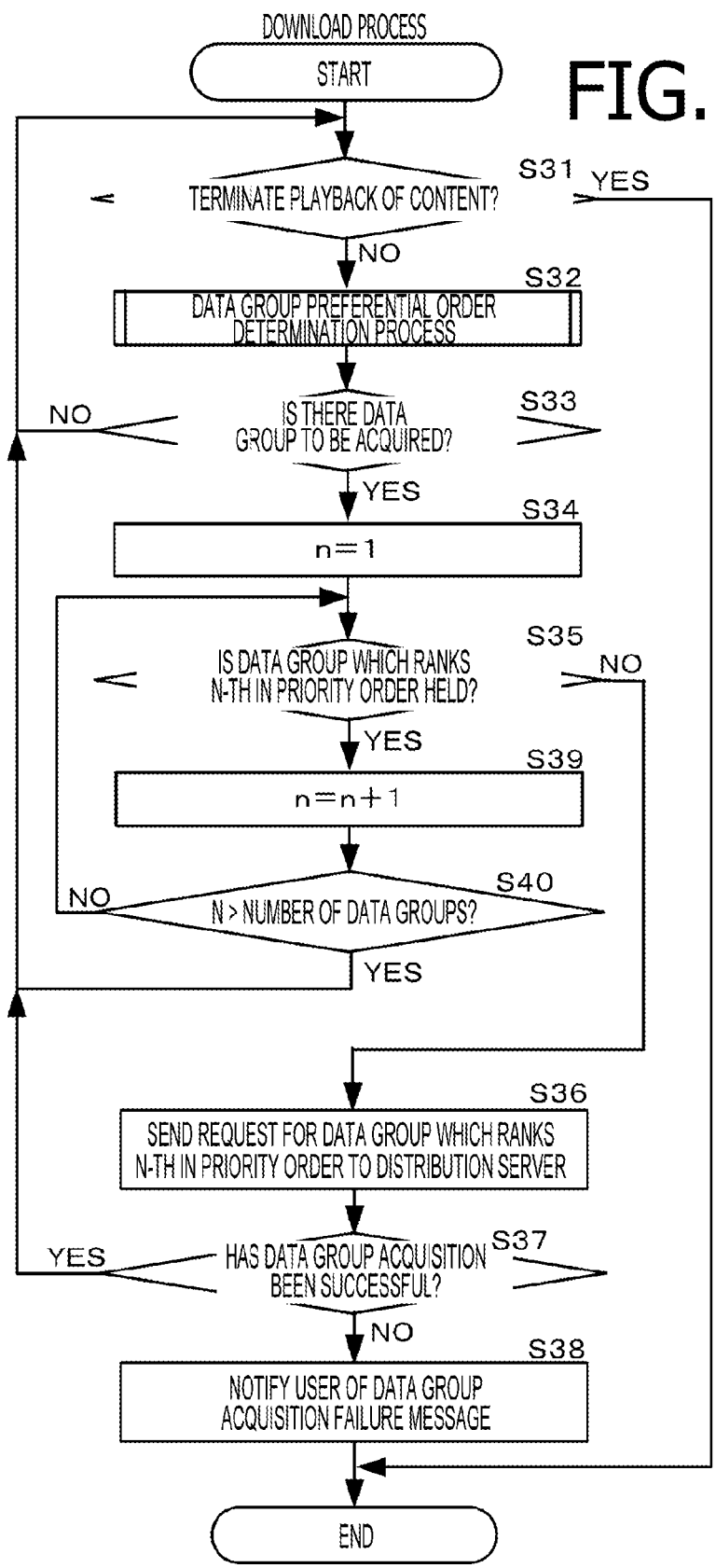
FIG. 7A is a flow chart showing a download process executed by the controller 21 of the client 2.
Figure 8A:
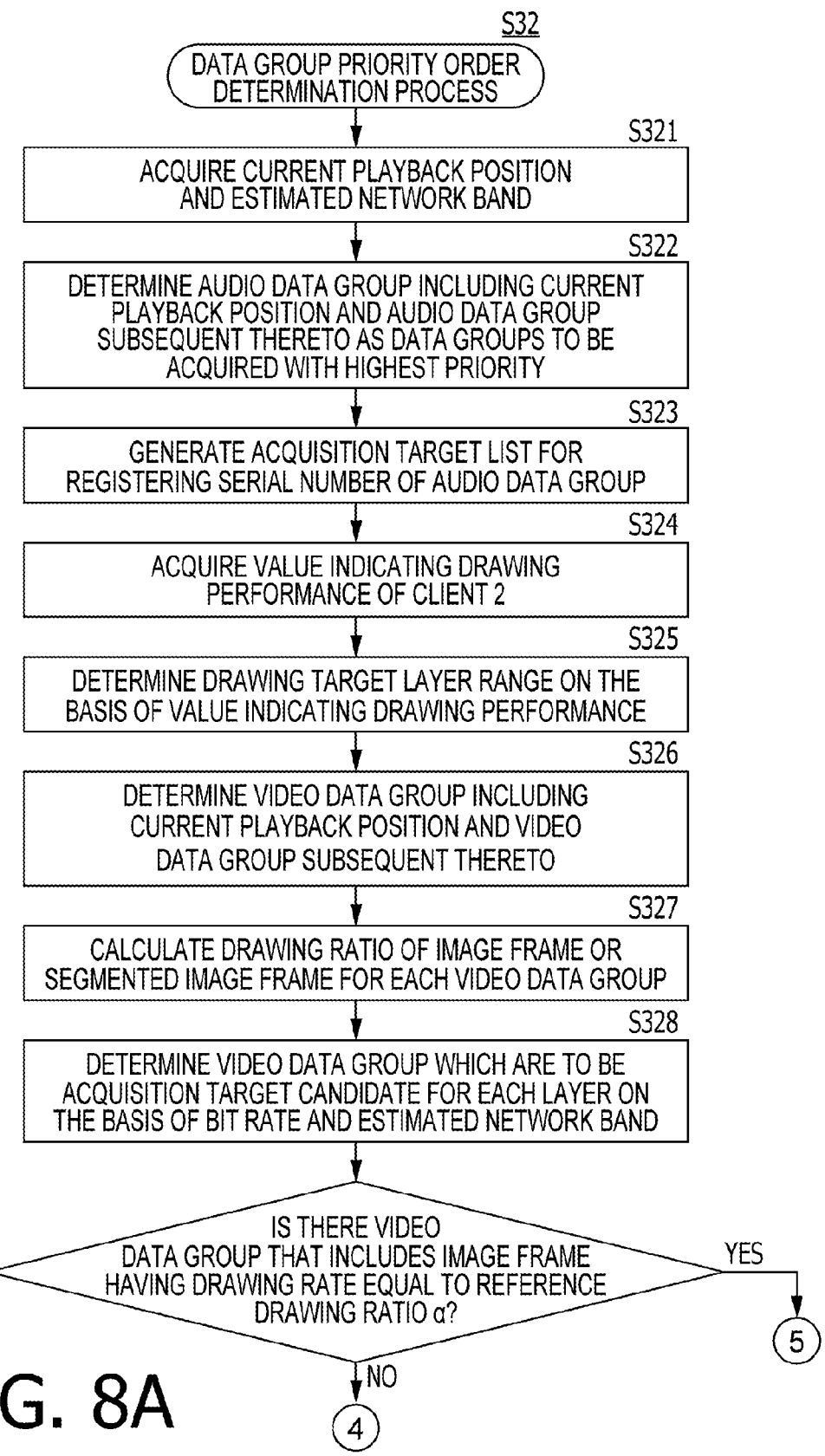
FIGS. 8A-8B are flow charts showing the data group priority order determination process executed by the controller 21 of the client 2.
Figure 8B:
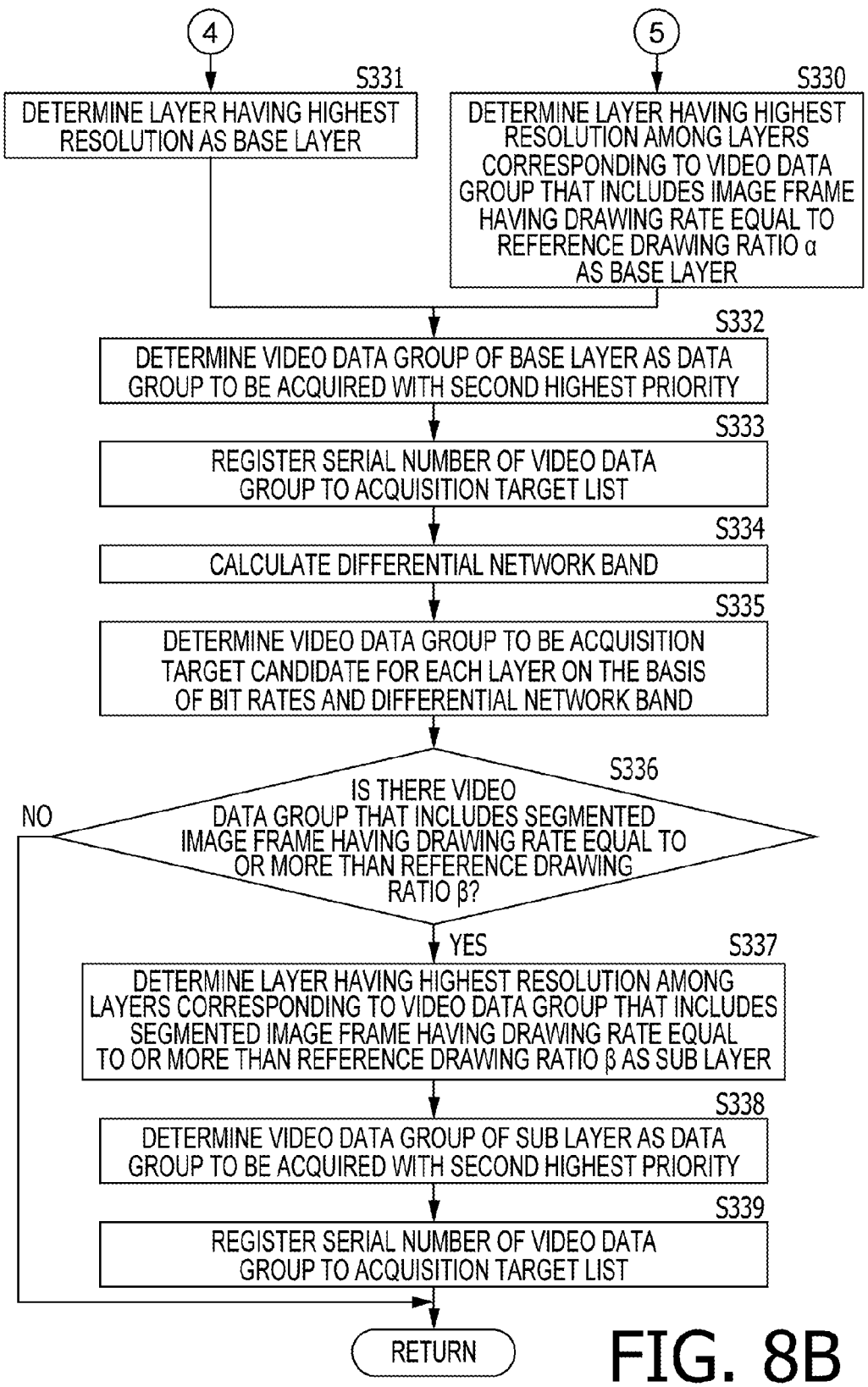
Figure 10:
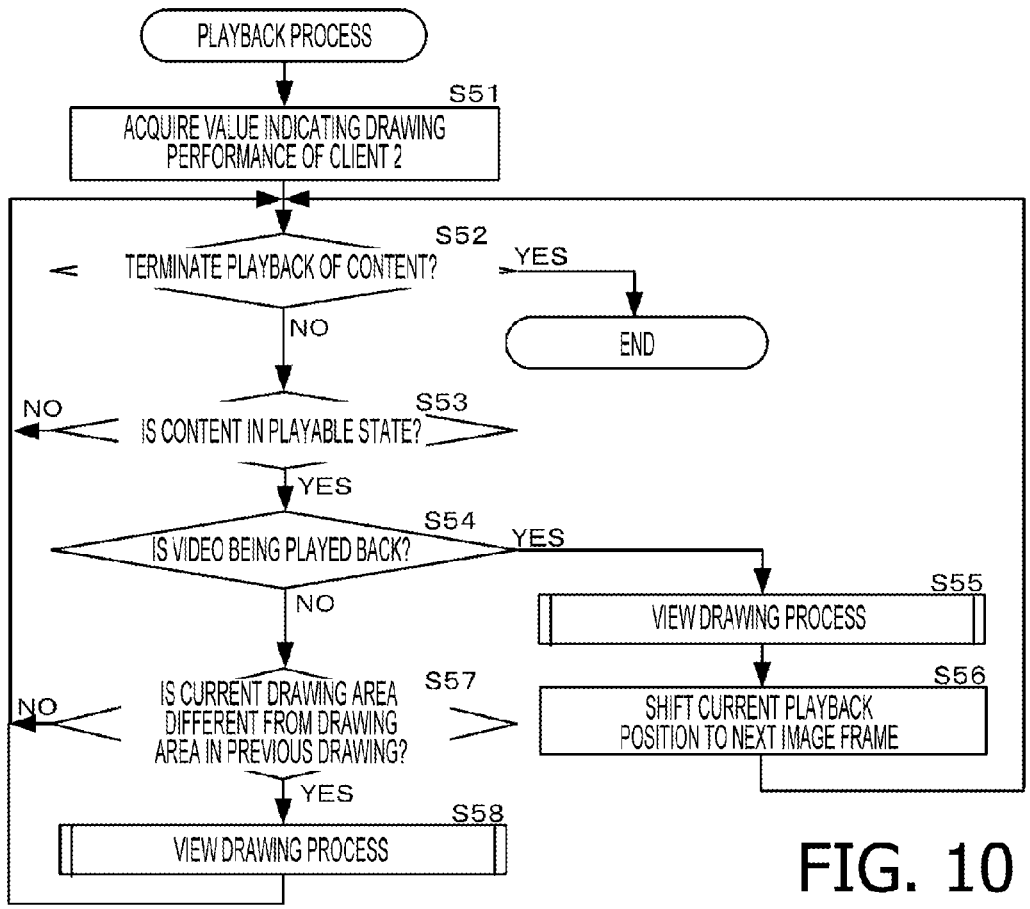
FIG. 10 is a flow chart showing a playback process executed by the controller 21 of the client 2.
Figure 11A:
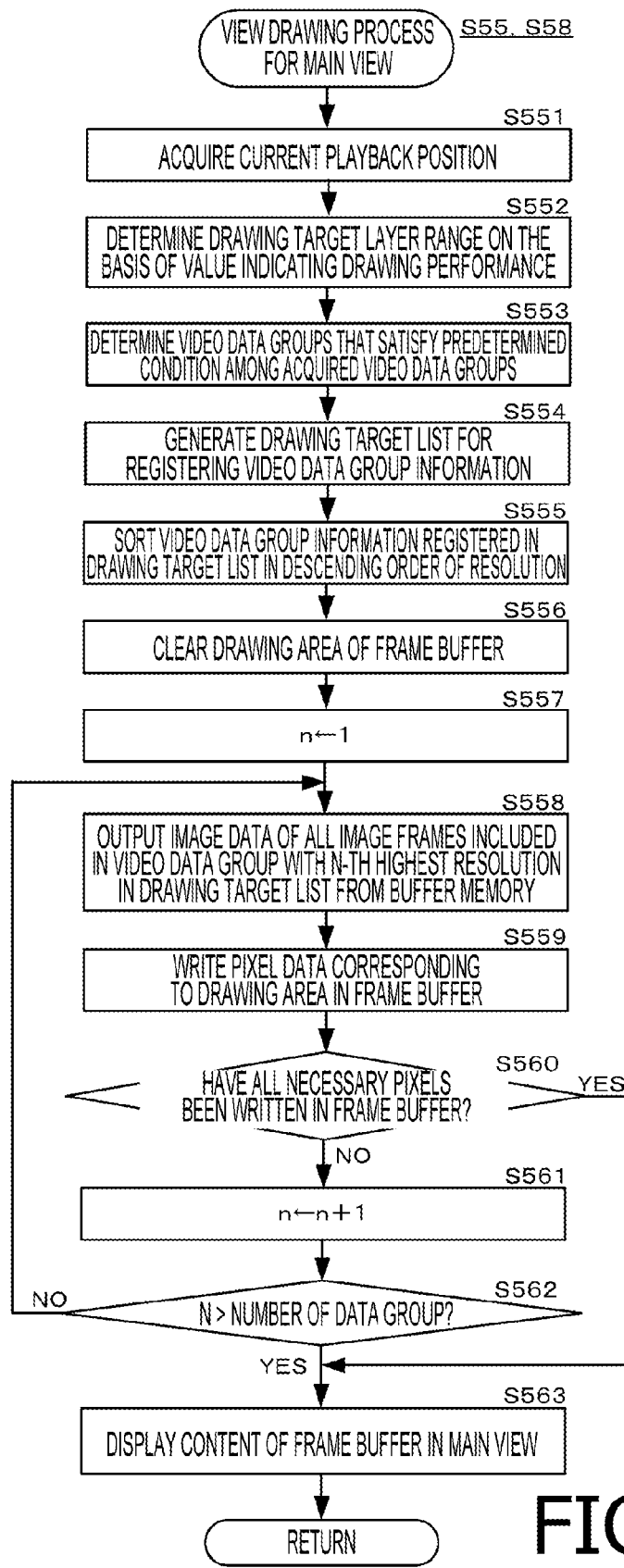
FIG. 11A is a flow chart showing a view drawing process executed by the controller 21 of the client 2.
Figure 11B:
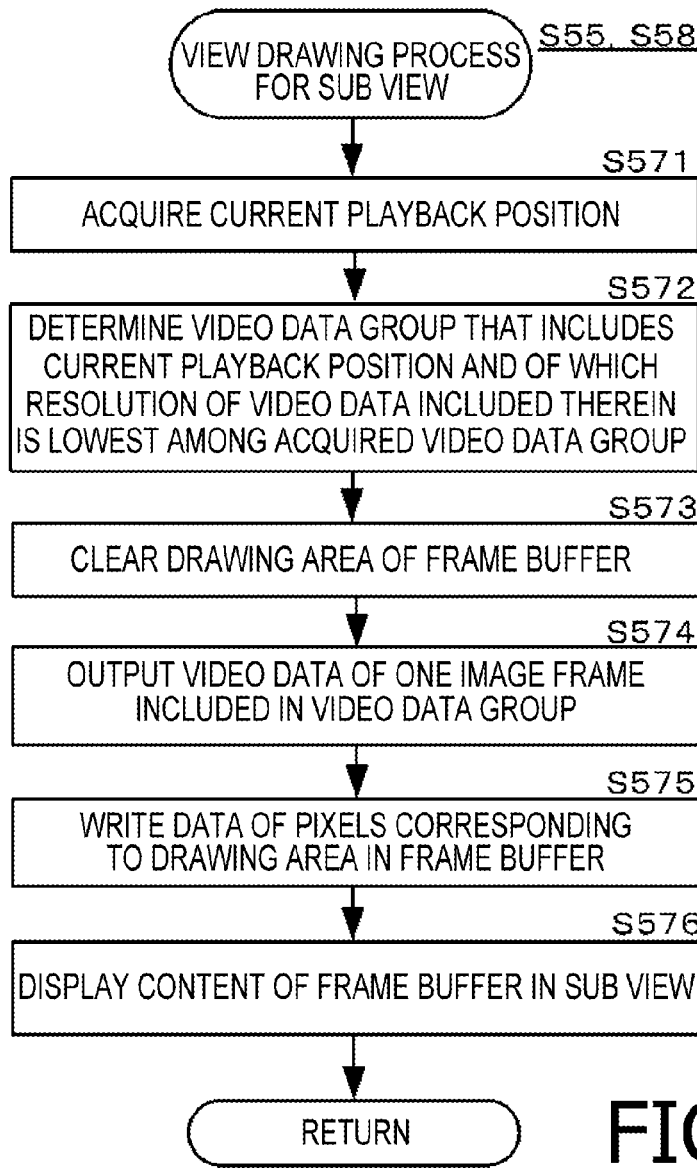
FIG. 11B is a flow chart showing a view drawing process executed by the controller 21 of the client 2.

Firstly, processes in the client 2 will be described with reference to FIGS. 6 to 9. FIGS. 6A-6C are flowcharts showing a main process by the controller 21 of the client 2. FIG. 7A is a flowchart showing a download process by the controller 21 of the client 2. FIGS. 8A-8B are flowcharts showing a data group priority order determination process by the controller 21 of the client 2. FIG. 10 is a flowchart showing a playback process by the controller 21 of the client 2. FIGS. 11A and 11B are flowcharts showing view drawing processes by the controller 21 of the client 2.

(2-1-1. Main Process)

Firstly, the main process by the controller 21 of the client 2 will be described with reference to FIGS. 6A-6C. For example, when a player software is activated in the client 2, the client 2 sends a page request to the distribution server 1. Then, the client 2 receives a Web page sent from the distribution server 1 in response to the page request, and displays the Web page on the display of the display unit 24*a*. In this Web page, for example, information of contents is selectably displayed. The information of contents to be displayed in the Web page is information of some contents among a plurality of contents uploaded to the distribution server 1. For example, information of contents which are to be recommended to the user or information of contents which are searched on the basis of keywords inputted by the user corresponds to this information. The information of contents includes, for example, titles of contents and file configurations. Then, when the user operates the operation unit 25*a* and selects information of a content to be played back, the main process shown in FIGS. 6A-6C starts. When the main process is started, for example, as shown in FIG. 3, the controller 21 displays the main view MV, the sub views SV1-SV5 and the source views SoV1 and SoV2 on the display of the display unit 24*a* (S1). Then, the controller 21 starts the download process shown in FIG. 7A and the playback process shown in FIG. 9 (S2). It is noted that the download process shown in FIG. 7A and the playback process shown in FIG. 9 are executed in parallel by, for example, a multitask function of the OS. The download process and the playback process will be described in detail later.

Then, the controller 21 sets an input of the pseudo camera work operation to the main view MV to "manual" (S3). Thereby, the input of the pseudo camera work operation becomes a manual input by the user. That is, the display range of the video displayed in the main view MV will not depend on the pseudo camera work data but will change by the pseudo camera work operation by the user. Then, the controller 21 executes initialization of query information of the pseudo camera work data and the work files (S4). The query information of the pseudo camera work data is information included in a request for the pseudo camera work data. The query information includes, for example, a title of content to be played back, playback positions of a video and a maximum response number of the pseudo camera work data. In the initialization process, the title of the content to be played back selected by the user is set in the query information, and 0 milliseconds is set as the playback position of the video in the query information. Also, in the initialization process, for example, the number of sub views is set as the maximum response number of the pseudo camera work data in the query information. Furthermore, in the initialization process, the title of the content to be played back selected by the user is set in the work file. It is noted that, in the query information and the work file, a content ID identifying the content may be set. Then, the controller 21 sends the request including the query information of the pseudo camera work data to the distribution server 1 via the network NW (S5).

Then, the controller 21 determines, for example, whether there has been a termination instruction by the user via the operation unit 25a (S6). If there has been a termination instruction (S6: YES), the process shown in FIGS. 6A-6C terminates. On the other hand, if there has been no termination instruction (S6: NO), the controller 21 proceeds to S7. In S7, the controller 21 determines whether the pseudo camera work data has been received from the distribution server 1. When determining that the pseudo camera work data has been received (S7: YES), the controller 21 proceeds to S8. When determining that the pseudo camera work data has not been received (S7: NO), the controller 21 proceeds to S9.

In S8, the controller 21 sets the pseudo camera work data received in S7 as an input of the pseudo camera work operation to each of the sub views SV1-SV5, and proceeds to S9. Thereby, the input of the pseudo camera work operation will be performed in accordance with the pseudo camera work data. That is, the display ranges of the videos displayed in each of the sub views SV1-SV5 are according to respective pseudo camera work data. It is noted that, if the number of the received pseudo camera work data is less than the number of the sub views SV1-SV5, nothing will be displayed in the remaining sub views.

In S9, the controller 21 determines whether there has been a video selection instruction via the operation unit 25a to select videos displayed in the sub views. For example, if the user clicks a sub view the user wants to select with the mouse, or if the user taps the sub view the user wants to select with their fingers or a pen, it is determined that there has been a video selection instruction to select videos displayed in the sub views. Then, when determining that there has been a video selection instruction to select videos displayed in the sub views (S9: YES), the controller 21 proceeds to S10. On the other hand, when determining that there has been no video selection instruction to select videos displayed in the sub views (S9: NO), the controller 21 proceeds to S11.

In S10, in response to the video selection instruction, the controller 21 sets, as the input of the pseudo camera work operation to the main view MV, the pseudo camera work data set as an input of the pseudo camera work operation to the selected sub view. Thereby, video displayed in the main view MV is switched to the selected video.

In S11, the controller 21 determines whether there have been pseudo camera work operations by the user via the operation unit 25a. It is noted that, as specific pseudo camera work operations, there are, for example, a drag operation and a flick operation. For example, in the drag operation, it is possible to shift the display range by the user dragging the main view MV with the mouse. Also, in the flick operation, it is possible to shift the display range by the user rapidly sliding a contacting object such as a finger or a pen on a touch panel type main view MV. Furthermore, as specific pseudo camera work operations, for example, there is an operation in which the display range is expanded or reduced by the user pressing buttons provided to the operation unit 25a or displayed on the display. In this operation, the display range is enlarged or reduced with increase in an amount of the change in the display range per unit time, and thereafter, the display range is changed with a constant amount of the change in the display range per unit time. The display range changes unless the user stops pressing the buttons, and the change stops when the display range reaches to the maximum or the minimum range. If the virtual screen is the rectangular virtual screen SC1, the expansion/reduction of the display range is a change in the width and the height of the display range R11. If the virtual screen is the cylindrical virtual screen SC2, the expansion/reduction of the display range is a change in the lateral view angle and the height. If the virtual screen is the spherical virtual screen SC3, the expansion/reduction of the display range is a change in the vertical view angle and the lateral view angle. It is noted that the above-described operations are merely examples, and the pseudo camera work may be performed by other operations.

Then, when determining that there have been pseudo camera work operations (S11: YES), the controller 21 proceeds to 12. On the other hand, when determining that there have been no pseudo camera work operations (S11: NO), the controller 21 proceeds to 14. In S12, if the input of the pseudo camera work operation is not set to "manual," the controller 21 sets it to "manual." Then, the controller 21 sets, in the query information, the pseudo camera work data that specifies the display range corresponding to the playback position at a point of time when the instruction of the display range in the image frame F constituting the video has been received by the pseudo camera work operation (S13), and proceeds to 19. Thereby, the query information in which the pseudo camera work data is set is sent to the distribution server 1. Hereinafter, the "playback position at a point of time when the instruction has been received" will be referred to as a "playback position at the time point of instruction reception." The pseudo camera work data indicating the display range corresponding to the playback position at the time point of instruction reception is, for example, pseudo camera work data indicating a display range for the playback position at the time point of instruction reception. Alternatively, the pseudo camera work data indicating the display range corresponding to the playback position at the time point of instruction reception may be pseudo camera work data indicating a display range at any point of time within Tp seconds (for example, 3 seconds) in the past before the playback position at the time point of instruction reception. Alternatively, the pseudo camera work data indicating the display range corresponding to the playback position at the time point of instruction reception may be pseudo camera work data indicating a display range at any point of time within Tf seconds (for example, 3 seconds) in the future after the playback position at the time point of instruction reception. Alternatively, the pseudo camera work data indicating the display range corresponding to the playback position at the time point of instruction reception may be pseudo camera work data indicating a display range at any point of time within a period from Tp seconds in the past to Tf seconds in the future with respect to the playback position at the time point of instruction reception.

Hereinafter, a method for generating the pseudo camera work data indicating the future display range will be described. For example, there is an algorithm in which, if a change instruction is received by the operation unit 25a, the change in the display range continues for a while in accordance with the received change instruction even if the user does not perform any operation afterward. The algorithm will be referred to as a display range alteration continuation algorithm. With the display range alteration continuation algorithm, display ranges during the change in the display range continues are regarded as being set in advance at the time when the change instruction is received. Thus, the controller 21 generates the pseudo camera work data indicating the display ranges posterior to the reception of the instruction by using the display range alteration continuation algorithm.

An example of operations to which the display range alteration continuation algorithm may be applied is the flick operation. When the flick operation is made, for example, the display range shifts in a direction opposite to the slide in accordance with the speed of the slide. Then, the speed of the shift in the display range gradually slows down, and the shift in the display range stops. In this case, the display ranges until the shift in the display range stops are determined at the time when the flick operation is made. Thus, the controller 21 may generate the pseudo camera work data indicating the future display range by using the display range alteration continuation algorithm. Furthermore, as operations to which the display range alteration continuation algorithm may be applied, for example, there are operations for expanding or reducing the display range. In the case of these operations, the controller 21 generates the pseudo camera work data indicating the future display range on the basis of the pseudo camera work data indicating the display range for the playback position at the time point of instruction reception, a predetermined increasing rate per unit time, and the maximum value of the degree of the change per unit time. At this time, the controller 21 generates the pseudo camera work data such that the amount of the change in the display range per unit time increases at the predetermined increasing rate per unit time.

It is noted that the above-mentioned operations are merely examples, and any operation may be acceptable as far as it makes the future display range predictable. As another example, there is a case where the pseudo camera work data is set as the input of the pseudo camera work operation to the main view MV before the input of the pseudo camera work operation is set to "manual" in S12. In this case, the controller 21 acquires the display range for Tf seconds in the future after the playback position at the time point of instruction reception indicated by the set pseudo camera work data. Then, the controller 21 generates the pseudo camera work data indicating the acquired display range as the pseudo camera work indicating the future display range.

In S14, the controller 21 determines whether there has been an input of a keyword by the user via the operation unit 25a. The keyword is for searching the pseudo camera work data the user desires. For example, consider a case where the user wants to search for the pseudo camera work data indicating a display range that displays only the specific singer in a video of a concert of an artist group. In this case, the user is to input the name of the above-mentioned specific singer as the keyword. When determining that the keyword has been input (S14: YES), the controller 21 proceeds to S15. On the other hand, when determining that the keyword has not been input (14: NO), the controller 21 proceeds to S16.

In S15, the controller 21 sets the input keyword to the query information and proceeds to S19. In S16, the controller 21 determines whether there has been a keyword clear instruction. When determining that there has been a keyword clear instruction (S16: YES), the controller 21 proceeds to S17. On the other hand, when determining that there has been no keyword clear instruction (S16: NO), the controller 21 proceeds to S18.

In S17, the controller 21 deletes the keyword from the query information and proceeds to S19. In S18, the controller 21 determines whether a predetermined time period has elapsed without operations by the user. This time period is, for example, set to about 1-10 seconds. Operations by the user include the pseudo camera work operation. When determining that the predetermined time period has elapsed without operations by the user (S18: YES), the controller 21 proceeds to S19. On the other hand, when determining that the predetermined time period has not elapsed without operations by the user (S18: NO), the controller 21 proceeds to S21.

In S19, the controller 21 sends a request including the query information of the pseudo camera work data to the distribution server 1 via the network NW. Thereby, in the image frame F corresponding to the playback position at the time point of instruction reception, the pseudo camera work data indicating the display range that is within a predetermined distance from the specified display range on the image frame F at the same playback position is acquired in S7. This pseudo camera work data is determined in S76 shown in FIG. 12B which will be described later. Then, if the pseudo camera work data is set to the query information in S13, the controller 21 deletes the pseudo camera work data from the query information (S20), and proceeds to S21. It is noted that, if the pseudo camera work data is not set to the query information in S13, the controller 21 proceeds directly to S21.

In S21, the controller 21 changes a setting value for the current playback position of the video to the playback position set in the query information. Then, the controller 21 stores pseudo camera work data, indicating the display range of the video displayed in the main view at the current playback position of the video, in the work file (S22). Then, the controller 21 determines whether the pseudo camera work data for a predetermined time range has been accumulated in the work file (S23). It is noted that the time range is, for example, set to about 30 seconds. In this case, for example, the pseudo camera work data is uploaded to the distribution server 1 after being divided into a plurality of pieces of pseudo camera work data such as pseudo camera work data for the playback positions of 0-30 seconds, pseudo camera work data for the playback positions of 30-60 seconds . . . . It is noted that, for example, during execution of the main process shown in FIGS. 6A-6C, the user may input information indicating features of the pseudo camera work corresponding to the upload target pseudo camera work data through the operation unit 25a. The input information indicating features of the pseudo camera work will be stored in the work file.

Then, when determining that the pseudo camera work data for the predetermined time range has not been accumulated in the work file (S23: NO), the controller 21 goes back to S6. On the other hand, when determining that the pseudo camera work data for the predetermined time range has been accumulated in the work file (S23: YES), the controller 21 proceeds to S24. In S24, the controller 21 sends the work file to the distribution server 1 via the network NW. It is noted that the work file may not be sent to the distribution server 1 after being divided, but may be sent in a lump from a start to an end of playback after the playback of the video is finished. Then, the controller 21 clears the work file (S25), and goes back to S6.

(2-1-2. Download Process)

Next, a download process carried out by the controller 21 of the client 2 will be described with reference to FIGS. 7 to 11. It is noted that, in the following description, a case where a plurality of pieces of video data having different resolutions are downloaded will be exemplified and explained. When a download process shown in FIG. 7A is started, a video stream list corresponding to video data indicated by information of a content selected by the user is generated for each piece of video data. For example, a video stream list for the layer 1, video stream lists for each of part 1-part 4 in the layer 2, and video stream lists for each of part 1-part 16 in the layer 3 are generated. The video stream list is a list for registering a serial number of each piece of video data group constituting a video stream. The video stream is a stream that is generated by the distribution server 1 from at least one of the video data and the segmented video data. The serial number is assigned in order of playback of the video data group. The count of serial numbers to be registered in each video stream list is the same. Additionally, if the content includes audio data, an audio stream list corresponding to the audio data is generated. The audio stream list is a list for registering a serial number of each audio data group constituting an audio stream. The audio stream is a stream that is generated by the distribution server 1 from the audio data. It is noted that the video stream and the audio stream are generated by the controller 21. In this case, a unit time for separating the video data or the audio data from the head position to the end position thereof is set in the player software in advance. Alternatively, the video stream list and the audio stream list may be generated by the distribution server 1 and sent to the client 2.

In S31 shown in FIG. 7A, the controller 21 determines whether to terminate playback of the content. If the controller 21 determines to terminate playback of the content (S31: YES), the process shown in FIG. 7A terminates. On the other hand, when determining not to terminate playback of the content (S31: NO), the controller 21 proceeds to S32. In S32, the controller 21 executes a data group preferential order determination process. In the data group preferential order determination process, as shown in FIG. 8A, the controller 21 acquires a current playback position and an estimated network band (S321). The estimated network band is an estimated value of a band of the network NW (bps) between the distribution server 1 and the client 2. The estimated network band is, for example, calculated by the controller 21 by measuring data transmission time between the client 2 and the distribution server 1.

Then, the controller 21 determines, from the audio stream list, an audio data group that includes the current playback position and an audio data group subsequent thereto as data groups to be acquired with highest priority (S322). Here, the current playback position is the playback position which has been acquired in S321. Then, the controller 21 generates an acquisition target list for registering the serial numbers of the audio data groups which has been determined in S322 (S323). To the serial number to be registered to the acquisition target list, information, indicating that it is a serial number of the audio data group, is added.

Then, the controller 21 acquires a value indicating drawing performance of the client 2 (S324). The drawing performance denotes a rendering performance indicating how many pixels are allowed to be drawn in the main view MV. In other words, the drawing performance indicates how much pixel data for one main view MV a frame buffer is allowed to buffer. It is noted that the acquisition of the value indicating the drawing performance in S324 may be executed only in the first data group priority order determination process. Alternatively, the value indicating the drawing performance may be acquired after the start of the download process shown in FIG. 7A and before the operation of S31.

Then, the controller 21 determines a drawing target layer range on the basis of the value indicating the drawing performance acquired in S324 (S325). For example, a case where the value indicating the drawing performance of the client 2 is 4M (pixels/frame) will be considered. In this case, in the example shown in FIG. 2, the image frames of the layer 1 and the layer 2 is capable of drawing the whole one image frame F. On the other hand, the image frame of the layer 3 is capable of drawing only ¼ of the image frame F. Therefore, in S325 explained above, the layer 1 and the layer 2 are determined as the drawing target layer range. On the other hand, For example, consider a case where the value indicating the drawing performance of the client 2 is 2M (pixels/frame). In this case, in the example shown in FIG. 2, only the image frame F of the layer 1 is capable of drawing the whole one image frame F. Therefore, in S325 explained above, the layer 1 is determined as the drawing target layer range.

Then, the controller 21 determines a video data group including the current playback position and a video data group subsequent thereto among the video stream lists of the layers determined in S325 explained above (S326). This determination is executed for every video streams of every layers determined in S325. For example, consider a case where the layers determined in S325 are the layer 1 and the layer 2. In this case, the video data group is determined for each of a video stream list of the layer 1, a video stream list of the part 1 in the layer 2, a video stream list of the part 2 in the layer 2, a video stream list of the part 3 in the layer 2, and a video stream list of the part 4 in the layer 2. Then, the controller 21 calculates a drawing ratio of the image frame or the segmented image frame for each video data group included in the video data groups determined in S326 explained above on the basis of the drawing area of the current playback position (S327). The drawing ratio of the image fame denotes a ratio of the image frame F or the segmented image frame in the drawing area.

Figure 9A:
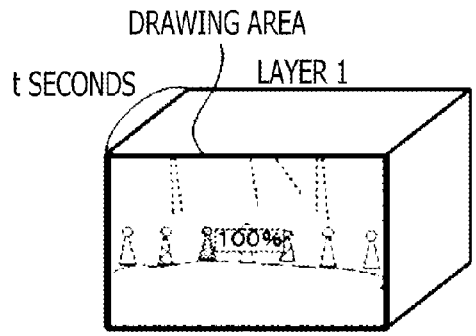
FIG. 9A shows a drawing area in an image frame of a layer 1.
Figure 9B:
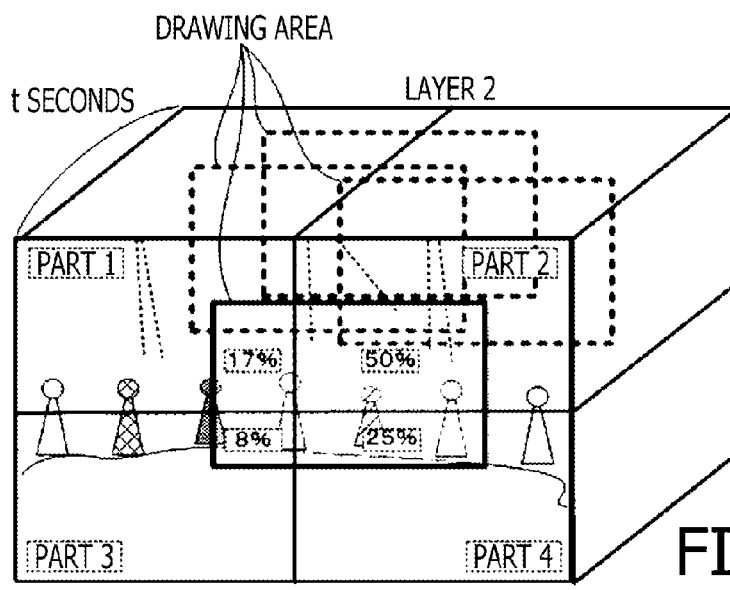
FIG. 9B shows a drawing area in a segmented image frame of a layer 2.

FIG. 9A shows a drawing area in the image frame of the layer 1. As shown in FIG. 9A, in the layer 1, a drawing ratio of the leading image frame F is 100%. FIG. 9B shows a drawing area of the segmented image frame in the layer 2. In the case of the segmented image, one part is not always capable of covering the whole drawing area. As shown in FIG. 9B, in the layer 2, the drawing ratio of the leading segmented image frame of the part 1 is 17%. Also, a drawing ratio of the leading segmented image frame of the part 2 is 50%. Further, a drawing ratio of the leading segmented image frame of the part 3 is 8%. Still further, a drawing ratio of the leading segmented image frame of the part 4 is 25%.

As described above, the drawing ratio of the leading segmented image frame of part 2 in the layer 2 is the largest. Furthermore, in the example shown in FIG. 9B, as indicated by a broken line, within each video data group, the position of the drawing area is changing in each segmented image frame. In this case, the drawing range of the image frame F or the segmented image frame subsequent to the image frame F or the segmented image frame for the current playback position is, for example, identified on the basis of the pseudo camera work data which is set as the input of the pseudo camera work operation to the main view MV. On the other hand, if no pseudo camera work data is set as the input of the pseudo camera work operation to the main view MV, the drawing range of the image frame F or the segmented image frame subsequent to the image frame F or the segmented image frame for the current playback position is estimated on the basis of the drawing range at the current playback position. That is, the drawing range is calculated by estimation on the basis of the change in the movement of the drawing range. For example, if the drawing range is moving rightwards over a plurality of segmented image frames, it is calculated by estimation that the drawing range of the subsequent segmented image frame is at a further right position. It is noted that the drawing ratio of the segmented image frame to be calculated in S327 is a sum or average of the drawing ratio of a plurality of segmented image frames included in the video data group.

Then, the controller 21 determines, for each layer, video data groups which are to be acquisition target candidates among the video data groups determined in S326 explained above, on the basis of bit rates of the video data groups determined in S326 explained above and the estimated network band acquired in S321 explained above (S328). The video data groups which are to be the acquisition target candidates are selected such that, for example, the bit rates for the video data groups of each layer become equal to or less than the estimated network band. It is noted that, in the case of the layer 2, the video data groups which are to be the acquisition target candidates are selected such that the sum of the bit rates for video data groups of part 1-part 4 becomes equal to or less than the estimated network band.

Figure 9C:
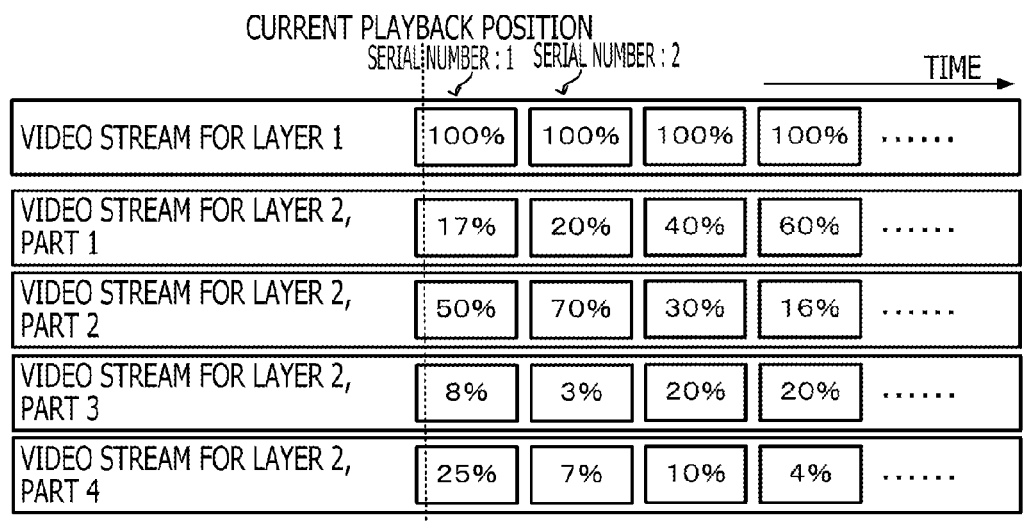
FIG. 9C shows how video data groups are determined as acquisition target candidates in video streams of the layer 1 and the layer 2.
Figure 9D:
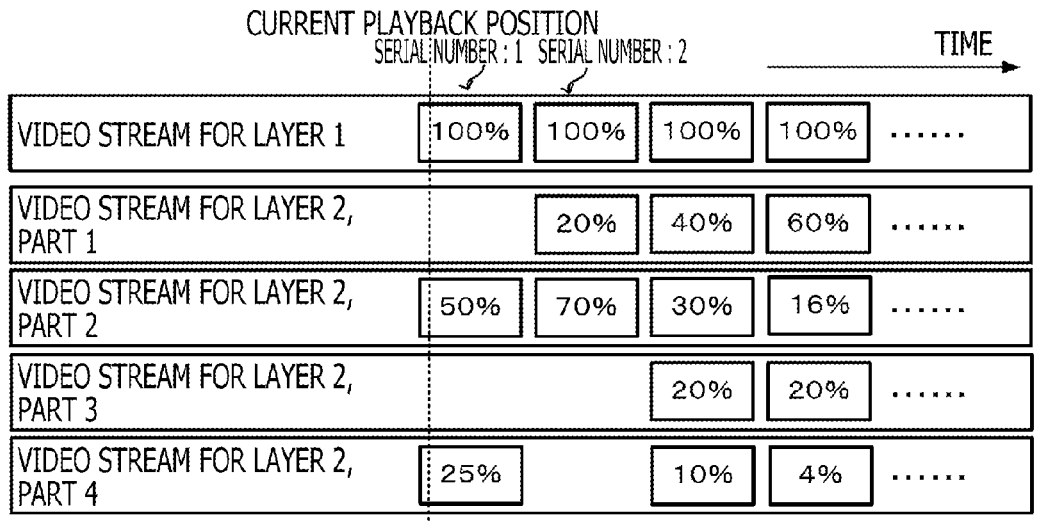
FIG. 9D shows how the video data groups are determined as the acquisition target candidates in the video streams of the layer 1 and the layer 2.

FIGS. 9C and 9D show how the video data groups which are to be the acquisition target candidates in the video streams of the layer 1 and the layer 2 are determined. As shown in FIGS. 9C and 9D, in the layer 1, all the video data groups determined in S326 explained above are determined as the acquisition target candidates. In the layer 2, among the video data groups determined in S326 explained above and having a serial number "1" (FIG. 9C), a video data group including the segmented image frame having the drawing ratio of 50% and a video data group including the segmented image frame having the drawing ratio of 25% are determined as the acquisition target candidates (FIG. 9D). This is because if a segmented image frame having the drawing ratio of 17% is further determined as the acquisition target candidate, the condition "bit rates of video data groups≤estimated network band" will not be satisfied. On the other hand, among the video data groups determined in S326 explained above having the serial number "2" (FIG. 9C), a video data group including the segmented image frame having the drawing ratio of 70% and a video data group including the segmented image frame having the drawing ratio of 20% are determined as the acquisition target candidates (FIG. 9D). As described above, video data groups including segmented image frames having higher drawing ratios are preferentially determined. Thereby, a higher resolution image can be displayed in a wider display range.

Then, the controller 21 determines whether there is a video data group, among the video data groups which are to be the acquisition target candidates determined in S328 described above, that includes an image frame F or the segmented image frame having a drawing rate equal to a reference drawing ratio α (S329). The reference drawing ratio α is preferable to be set to 100%. However, it may be set to between 90%-100%. Then, when determining that there is a video data group that includes the image frame F or the segmented image frame having the drawing rate equal to the reference drawing ratio α (S329: YES), the controller 21 proceeds to S330. On the other hand, when determining that there is no video data group that includes the image frame F or the segmented image frame having the drawing rate equal to the reference drawing ratio α (S329: NO), The controller 21 proceeds to S331.

In S330, the controller 21 determines a layer that has the highest resolution among the layers corresponding to the video data groups that includes the image frame F or the segmented image frame having the drawing rate equal to the reference drawing ratio α as a base layer, and proceeds to S332. That is, among a plurality of video data groups, a video data group that has a high resolution and includes the image frame F having a high drawing ratio is preferentially set as the video data group of the base layer. Thereby, an image having a higher resolution may be displayed in a wider display range. In the example shown in FIGS. 9C and 9D, the layer corresponding to the video data group that includes the image frame F or the segmented image frame having the drawing rate equal to the reference drawing ratio α is the layer 1 only. Therefore, the layer 1 is determined as the base layer. Meanwhile, suppose, for instance, that the layer 1-layer 3 are the layers corresponding to the video data groups including the image frame F or the segmented image frame that has the drawing rate equal to the reference drawing ratio α. In this case, the layer 3 having the highest resolution will be determined as the base layer. Furthermore, in this case, since there is no layer that has the resolution higher than the layer 3, the process shown in FIGS. 8A-8B ends and the controller 21 returns to the process shown in FIG. 7A. On the other hand, in S331, the controller 21 determines the layer that has the highest resolution among the layers corresponding to the video data groups including the image frame F or the segmented image frame having the highest drawing rate as the base layer and proceeds to S332.

In S332, the controller 21 determines the video data group of the base layer determined in 330 or S331 described above as the data group to be preferentially acquired after the audio data group. Then, the controller 21 registers the serial number of the video data group determined in S332 to the above-mentioned acquisition target list (S333). It is noted that information indicating that the serial number is for the video data group and information indicating the layer are added to the serial number to be registered to the acquisition target list.

Then, the controller 21 calculates a differential network band obtained by subtracting the bit rate of the video data for the base layer from the estimated network band (S334). The margin of the band of the network NW is also referred to as a free band of the network NW between the client 2 and the distribution server 1. In other words, the margin of the band of the network NW is an available band which may be used between the client 2 and the distribution server 1 via the network NW. the differential network band is a difference between the band of the network NW and the band used to acquire the video data group of the base layer from the distribution server 1.

Then, the controller 21 determines the video data groups which are to be the acquisition target candidates for every layer again from the video data groups determined in S326 explained above on the basis of the bit rates of the video data groups determined in S326 explained above and the differential network band calculated in S334 explained above (S335). It is noted that, being determined as the data group to be acquired in S332 explained above, the video data group of the base layer is excluded from the acquisition target candidates. For example, the video data groups which are to be the acquisition target candidates are selected such that the bit rates of the video data groups corresponding to layers other than the base layer becomes equal to or less than the differential network band. If there is space in the differential network band, at least one video data group including the segmented image frame is determined. By the process of S335, it becomes possible to acquire the video data groups in accordance with the differential network band.

Then, the controller 21 determines whether there is a video data group, among the video data groups which are to be the acquisition target candidates determined in S335 explained above, that includes a segmented image frame having a drawing rate equal to or more than a reference drawing ratio β (S336). The reference drawing ratio β is, for example, set to 70%. However, it may be set to between 60%-90%. Then, when determining that there is a video data group that includes the segmented image frame having the drawing rate equal to or more than the reference drawing ratio β (S336: YES), the process proceeds to S336. On the other hand, if the controller 21 determines that there is no video data group that includes the segmented image frame having the drawing rate equal to or more than the reference drawing ratio β (S336: NO), the process shown in FIGS. 8A-8B ends and the controller 21 returns to the process shown in FIG. 7A.

In S337, the controller 21 determines a layer, having the highest resolution among layers corresponding to the video data groups including a segmented image frame having a drawing rate equal to or more than the reference drawing ratio α, as a sub layer. Then, the controller 21 determines the video data group of the sub layer determined in S337 explained above as the video data group to be preferentially acquired after the video data group for the base layer (S338). Then, the controller 21 registers the serial number of the video data group determined in S338 to the above-mentioned acquisition target list (S339), and returns to the process shown in FIG. 7A. It is noted that, information indicating that the serial number is for the video data group, information indicating the layer, and information indicating the part are added to the serial number to be registered to the acquisition target list.

FIG. 7B exemplifies information registered in the acquisition target list generated by the data group priority order determination process. As shown in FIG. 7B, a priority level is associated with the serial number of each data group registered in the acquisition target list. A data group associated with a smaller value of the priority level is a data group to be acquired with a higher priority. It is noted that the information registered in the acquisition target list changes in the course of the playback of the content.

Returning to the process shown in FIG. 7A, in S33, the controller 21 refers to the acquisition target list and determines whether there is a data group to be acquired form the distribution server 1. If the serial number of the data group is registered in the acquisition target list, the controller 21 determines that there is a data group to be acquired. Then, when determining that there is a data group to be acquired (S33: YES), the controller 21 proceeds to S34. On the other hand, when determining that there is no data group to be acquired (S33: NO), the controller 21 returns to S31.

In S34, the controller 21 sets "1" to a variable n. Then, the controller 21 determines whether the data group which ranks n-th in the priority level in the acquisition target list is held in the buffer memory (S35). That is, whether the data group which ranks n-th in the priority level is already acquired is determined by the process shown in FIG. 7A. Then, when determining that the data group which ranks n-th in the priority level is not held (S35: YES), the controller 21 proceeds to S36. In S36, the controller 21 sends a request for the data group which ranks n-th in the priority level to the distribution server 1. Thereby, the controller 21 is allowed to request the distribution server 1 a data group including at least one segmented video data to be the acquisition target. Then, for example, the controller 21 may receive, from the distribution server 1, a data group including a video data of a low resolution as well as a data group including the segmented video data of a middle resolution or a high resolution that is higher than the low resolution. Then, the controller 21 determines whether the acquisition of the data groups has been successful (S37). If the data groups have not been received in response to the request for the data groups, the controller 21 determines that the acquisition of the data groups has failed (S37: NO) and proceeds to S38. In S38, a data group acquisition failure message is notified to the user, and the process shown in FIG. 7A ends. The data group acquisition failure message is a message indicating a failure in the data group acquisition.

On the other hand, if the reception of the data groups distributed by streaming from the distribution server 1 in response to the request for the data group is completed, the controller 21 determines that the acquisition of the data groups has been successful (S37: YES). In this case, the controller 21 returns to S31, and if the playback of the content does not terminate (S31: NO), the controller 21 executes the data group preferential order determination process again (S32). That is, each time the data groups are acquired, the data groups which are to be the acquisition targets are determined by the data group preferential order determination process. If only a little time has elapsed since the execution of the previous data group preferential order determination process, the data group including the current playback position does not change. Therefore, the content of the acquisition target list generated by the data group preferential order determination process executed again is identical to the acquisition target list generated by the previous data group preferential order determination process. In this case, when determining that the data group that ranks n-th in the priority level is held (S35: YES), the controller 21 proceeds to S39. In S39, the controller adds "1" to the variable n. Then, the controller determines whether the variable n is larger than a number of data groups (S40). The number of data groups is a number of data groups of which the serial numbers are registered in the acquisition target list. Then, when determining that the variable n is not larger than the number of data groups (S40: NO), the controller 21 returns to S35. At this time, if the data group of which the priority level is n+1 is not held, a request for n+1-th data group is sent to the distribution server 1 (S36). On the other hand, when determining that the variable n is larger than the number of data groups (S40: YES), the controller 21 returns to S31. This is a case where all the data groups registered in the acquisition target list of the time is acquired. As described above, the data group preferential order determination process is executed each time the data group is acquired from the distribution server 1. Therefore, in accordance with the states of progress of the playback and the acquisition of the video data, appropriate data groups at each point of time may be determined as the acquisition targets.

It is noted that, in a case where there are a plurality of pieces of video data of video, there is a case where the main view MV is provided for each piece of the video data. In this case, the download process shown in FIG. 7A is executed to acquire video data corresponding to each video.

It is noted that, although, in the above-mentioned download process, a plurality of pieces of video data having different resolutions are exemplified, a plurality of pieces of video data having the same resolution are also possible.

(2-1-3. Playback Process)

Next, the playback process by the controller 21 of the client 2 will be described with reference to FIGS. 10 and 11. When the playback process shown in FIG. 10 is started, the controller 21 acquires a value indicating the drawing performance of the client 2 (S51). Then, the controller 21 determines whether to terminate playback of the content (S52). When determining to terminate playback of the content (S52: YES), the controller 21 terminates the process shown in FIG. 10. On the other hand, when determining not to terminate playback of the content (S52: NO), the controller 21 proceeds to S53.

In S53, the controller 21 determines whether the content is in a playable state. For example, if video data groups sufficient for playback are held in the buffer memory, the controller 21 determines that the content is in the playable state. When determining that the content is in the playable state (S53: YES), the controller 21 proceeds to S54. On the other hand, when determining that the content is not in the playable state (S53: NO), the controller 21 determines whether the video is being played back. For example, if the image frame F is changing, the controller 21 determines that the video is being played back (S54: YES) and proceeds to S55. On the other hand, when determining that the video is not being played back (S54: NO), the controller 21 proceeds to S57. A temporary pause corresponds to the state in which the video is not being played back.

In S55, the controller 21 executes the view drawing process. The view drawing process will be described in detail later. Then, the controller 21 shifts the current playback position to the next image frame F (S56), and returns to S52. In S57, the controller 21 determines whether a current drawing area is different from a drawing area in previous drawing. When determining that the current drawing area is not different from the drawing area in the previous drawing (S57: NO), the controller 21 returns to S52. Meanwhile, when determining that the current drawing area is different from the drawing area in the previous drawing (S57: YES), the controller 21 proceeds to S58. In S58, the controller 21 executes the view drawing process. This is because, even when the video is temporarily paused, if the drawing area is updated by a pseudo camera work operation by the user, the view drawing process needs to be executed again.

FIG. 11A shows a view drawing process for the main view MV. On the other hand, FIG. 11B shows a view drawing process for each of the sub views SV1-SV5. These view drawing processes are executed in parallel by, for example, a multi-task function of the OS.

In the view drawing process for the main view MV, as shown in FIG. 11A, the controller 21 identifies the current playback position (S551). Then, the controller 21 determines the drawing target layer range on the basis of the value indicating the drawing performance acquired in S5 explained above (S552). The process in S552 is the same as the process in S325. Then, the controller 21 determines, among the acquired video data groups, video data groups that satisfy predetermined conditions (S553). For example, video data groups that satisfy all the following conditions (a)-(c) as the predetermined conditions are determined.

(a) The video data group includes the current playback position.

(b) The current drawing area includes at least a portion of the image frame F or the segmented image frame.

(c) The video data group belongs to the drawing target layer.

The current playback position denotes the playback position identified in S551 explained above. Furthermore, the current drawing area is identified, for example, in accordance with the input of the pseudo camera work operation to the main view MV. Furthermore, the drawing target layer is the layer determined in S552 explained above.

Then, the controller 21 generates a drawing target list for registering information of the video data groups determined in S553 (S554). The information of the video data groups is, for example, a serial number of the video data group. Then, the controller 21 sorts the information of the video data groups registered in the drawing target list in decreasing order of resolution (S555). That is, the information of the video data groups is rearranged in descending order of resolution of the video data included in the video data groups. It is noted that the video data to be the target of the rearrangement includes the segmented video data. Then, the controller 21 clears the drawing area of the frame buffer corresponding to the main view MV (S556).

Then, the controller 21 sets "1" to the variable n (S557). Then, the controller 21 outputs, from the buffer memory, image data corresponding to one image frame F or one segmented image frame that is included in the video data group having an n-th highest resolution in the drawing target list (S558). Then, the controller 21 writes, into the frame buffer, pixel data corresponding to the above-identified drawing area in the image frame F or the segmented image frame constituting the video (S559). In this regard, however, the writing operation in S559 is controlled such that already-written pixel data is not overwritten.

Then, the controller 21 determines whether all pieces of pixel data necessary for the image frame F or the segmented image frame are written in the frame buffer (S560). When determining that all the pieces of pixel data necessary for the image frame F or the segmented image frame are not written in the frame buffer (S560: NO), the controller 21 proceeds to S561. On the other hand, when determining that all the pieces of pixel data necessary for the image frame F or the segmented image frame are written in the frame buffer (S560: YES), the controller 21 proceeds to S563.

In S561, the controller 21 adds "1" to the variable n. Then, the controller determines whether the variable n is larger than a number of data groups (S562). The number of data groups is a number of video data groups of which the serial numbers are registered in the drawing target list. Then, when determining that the variable n is not larger than the number of data groups (S562: NO), the controller 21 returns to S558. The process of S558 is repeated multiple times, but the video data having a higher resolution is preferentially played back. Therefore, in the first process, pixel data necessary for a segmented image frame having a higher resolution is written. In the following process, for example, the image frame F constituting the video of low resolution is written in a writing area of the frame buffer in which pixel data necessary for the segmented image frame has not been written. On the other hand, when determining that the variable n is larger than the number of data groups (S562: YES), the controller 21 proceeds to S563. In S563, the controller 21 displays the content of the frame buffer in the main view MV. Thereby, the controller 21 displays, for example, the video played back by the video data of low resolution in the main view MV, along with displaying, for example, on at least a part of the image frame F of this video, the video played back by the segmented video data of the middle or the high resolution. Thereby, videos of the low and the high resolutions may be flexibly displayed in the main view MV in accordance with the performance of the client 2. It is noted that, if the audio data is being played back, the controller 21 displays the video synchronized with the playback position of the audio data. Furthermore, in a case where there are a plurality of pieces of video data of video, there is a case where the main view MV is provided for each piece of the video data. In this case, the drawing process shown in FIG. 11A is executed to display video data corresponding to each video.

On the other hand, in the drawing process for each of the sub views SV1-SV5, as shown in FIG. 11B, the controller 21 identifies the current playback position (S571). Then, the controller 21 determines a video data group that includes the current playback position and of which the resolution of the video data included in the video data group is the lowest among the acquired video data groups (S572). The video data group of which the resolution of the video data is the lowest is, for example, a video data group that is included in the video stream of the layer 1. Then, the controller 21 clears the drawing area of the frame buffer corresponding to each of the sub views SV1-SV5 (S573).

Then, the controller 21 outputs video data of one image frame F included in the video data group determined in S572 (S574). Then, the controller 21 writes pixel data corresponding to the drawing area in the image frame F constituting the video (S575). This drawing area is determined from the display range indicated by the pseudo camera work having been set as the input of the pseudo camera work operation to each of the sub views SV1-SV5 in S8 explained above. Then, the controller 21 displays the content of the frame buffer in each of the sub views SV1-SV5 (S576). Thereby, controller 21 displays the video played back by the video data of low resolution in each of the sub views SV1-SV5.

It is noted that, although, in the above-mentioned playback process, a plurality of pieces of video data having different resolutions are exemplified, a plurality of pieces of video data having the same resolution are also possible.

(2-2. Process in Distribution Server 1)

Next, the process in the distribution server 1 will be described with reference to FIG. 12. FIG. 12 shows a flow chart of a work file registration process executed by the controller 11 of the distribution server 1. FIG. 12B shows a flow chart of a pseudo camera work data request reception process executed by the controller 11 of the server 1.

Figure 12A:
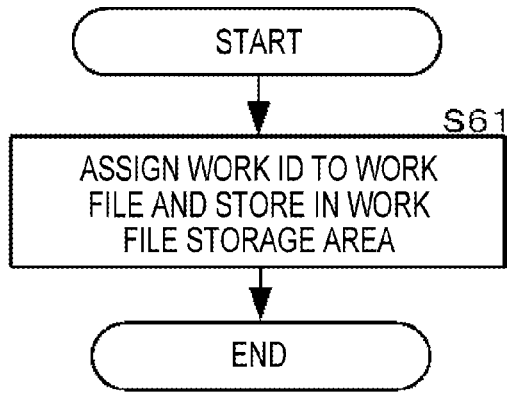
FIG. 12A is a flow chart showing a work file registration process executed by a controller 11 of a server 1.
Figure 12B:
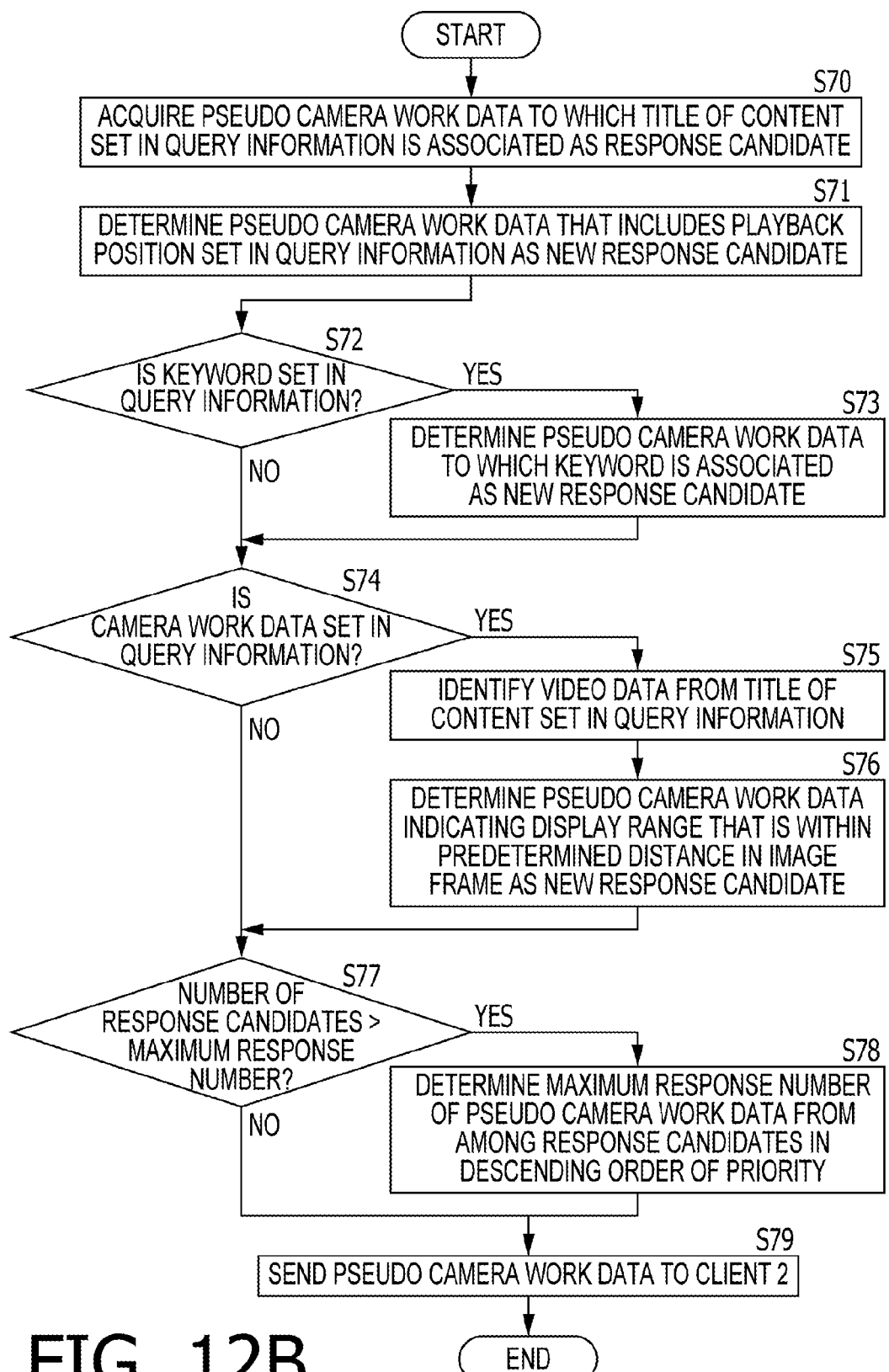
FIG. 12B is a flow chart showing a pseudo camera work data request reception process executed by the controller 11 of the server 1.

The work file registration process shown in FIG. 12A is started when the work file sent in S24 explained above is received from the client 2. Meanwhile, suppose, for instance, that the display frequency table shown FIG. 4B is used in the work file registration process which will be described below. When the work file registration process is started, the controller 11 identifies contents of video data from the video data storage area 31a on the basis of a title of a content set in the acquired work file (S61).

Then, the pseudo camera work data request reception process shown in FIG. 12B is started when the pseudo camera work data request sent at S5 or S19 explained above is received. This request includes the above-mentioned query information. When the pseudo camera work data request reception process is started, the controller 11 acquires, from among the work files stored in the work file storage area 31c, pseudo camera work data to which the title of content set in the query information is associated, as the response candidates (S70).

Then, the controller 11 determines, among the response candidates acquired in S70, the pseudo camera work data that includes the playback position set in the query information as new response candidates (S71). That is, from among the response candidates determined in S70, the response candidates are narrowed down to the pseudo camera work data which include the playback position set in the query information.

Then, the controller 11 determines whether a keyword is set in the query information (S72). When determining that a keyword is set in the query information (S72: YES), the controller 11 proceeds to S73. On the other hand, when determining that a keyword is not set in the query information (S72: NO), the controller 11 proceeds to S74.

In S73, the controller 11 determines, among the response candidates determined in S71, the pseudo camera work data to which the keyword set in the query information is associated, as the new response candidates. For example, if the keyword set in the query information is included in the title of content or the information indicating features of the pseudo camera work in the work file, the pseudo camera work data stored in this work file is determined as the new response candidate.

In S74, the controller 11 determines whether the pseudo camera work data is set in the query information. When determining that the pseudo camera work data is set in the query information (S74: YES), the controller 11 proceeds to S75. On the other hand, When determining that the pseudo camera work data is not set in the query information (S74: NO), the controller 11 proceeds to S77.

In S75, the controller 11 identifies the video data of the content from the video data storage area 31a, on the basis of the title of content set in the query information. Then, from among the response candidates determined in S71 or S73, the controller 11 determines, as a new response candidate, pseudo camera work data that indicates a display range within a predetermined distance from the display range indicated by the pseudo camera work data set in the query information, on the image frame F at the same playback position in the video data identified in S75. The above predetermined distance denotes a distance determined to be a short distance on the image frame F. For example, this distance is set equal to or less than 10 cm. Hereinafter, the pseudo camera work data set in the query information will be referred to as a "first pseudo camera work data." Hereinafter, the pseudo camera work data, which is the response candidate determined in S71 or S73, will be referred to as a "second pseudo camera work data." The process of S76 may be set to be different depending on the type of the virtual screen.

For example, there is a case where the virtual screen is the rectangular screen SC1. In this case, the controller 11 calculates a distance between a first predetermined point in the display range indicated by the first pseudo camera work data and a second predetermined point in the display range indicated by the second pseudo camera work data. The first predetermined point and the second predetermined point are central coordinates (x0, y0) of respective display ranges. The first predetermined point and the second predetermined point are, in the example shown in FIG. 4A, the center of the display range R11. Alternatively, the first predetermined point and the second predetermined point may be coordinates (x1, y1) of one of four corners of the respective display ranges. Then, the controller 11 determines whether the calculated distance is equal to or less than a threshold. If the calculated distance is equal to or less than the threshold, the controller 11 determines the second pseudo camera work data as a new response candidate.

On the other hand, there is a case where the virtual screen is the cylindrical screen SC2 or the spherical screen SC3. In this case, it is determined whether the display range indicated by the second pseudo camera work data is within the predetermined distance from the display range indicated by the first pseudo camera work data on the image frame F at the same playback position, on the basis of the visual line direction from the view point in the three-dimensional virtual space to the predetermined point in the display range indicated by the pseudo camera work data. For example, suppose that the image frames F specified by each of the first and the second pseudo camera work data are projected on a virtual body face in the three-dimensional virtual space. In this case, the controller 11 calculates at least an angle between a first visual line direction from a view point in the three-dimensional virtual space, the first visual line being the line to a first predetermined point in the display range indicated by the first pseudo camera work data, and a second visual line direction from the same view point, the second visual line being the line to a second predetermined point in the display range indicated by the second pseudo camera work data. It is noted that, in a case of the cylindrical screen SC2, the view point is, for example, the central point of the central axis of the cylinder. In the example shown in FIG. 4B, the first predetermined point and the second predetermined point in this case are the center of the display range R12. Furthermore, in a case of the spherical screen SC3, the view point is, for example, the center of the sphere. In the example shown in FIG. 4C, the first predetermined point and the second predetermined point in this case are the center of the display range R13. Then, the controller 11 determines whether the calculated angle is equal to or less than the threshold. If the calculated angle is equal to or less than the threshold, the controller 11 determines the second pseudo camera work data as a new response candidate.

It is noted that, if the virtual screen is the cylindrical screen SC2, the controller 11 may be configured to calculate a distance between the first predetermined point in the display range indicated by the first pseudo camera work data and the second predetermined point in the display range indicated by the second pseudo camera work data. In this case, the first predetermined point and the second predetermined point are similar to the case of the rectangular screen SC1. Then, if the calculated distance is equal to or less than the threshold, the controller 11 determines the second pseudo camera work data as a new response candidate. Alternatively, if the angle calculated above is equal to or less than the threshold and the calculated distance is equal to or less than the threshold, the controller 11 may be configured to determine the second pseudo camera work data as a new response candidate. Furthermore, there is a case where the pseudo camera work data specifies the display ranges for a plurality of playback positions. In this case, the controller 11 is, for example, configured to determine the second pseudo camera work data as a new response candidate by executing the process of S76 for each playback position.

In S77, the controller 11 determines whether the number of response candidates determined in S71, S73 or S76 is larger than a maximum response number set in the query information. When determining that the number of response candidates is larger than the maximum response number (S77: YES), the controller 11 proceeds to S78. On the other hand, when determining that the number of response candidates is not larger than the maximum response number (S77: NO), the controller 11 proceeds to S79. In S78, from among the response candidates determined in S71, S73 or S76, the controller 11 determines, as new response candidates, the above-mentioned maximum response number of pieces of pseudo camera work data in descending order of priority. It is noted that the "descending order of the priority" may be configured to be set as a descending order from the latest date and time of pseudo camera work data registration date and time, an ascending order of access ranking, or a descending order of high community rating such as "like."

In S79, the controller 11 sends the pieces of pseudo camera work data being the response candidates determined in S71, S73, S76, or S78 to the client 2 as the requestor of the pseudo camera work data.

As describe above, according to the above-mentioned illustrative embodiment, the client 2 is configured such that the pseudo camera work data indicating the display range that is within a predetermined distance from the specified display range within the image frame corresponding to the playback position at the time point of reception of the instruction to specify the specified display range being a portion within a corresponding one of the image frames constituting the video displayed in the main view is acquired. Therefore, display range information indicating a display range that is visible from a viewpoint position close to a user's current viewpoint position may be provided as the appropriate display range information to be recommended to the user.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

In the aforementioned illustrative embodiment, a configuration in which the client 2 receives the content and the pseudo camera work of the content from the distribution server 1 is shown. However, in a hybrid type or a peer type peer to peer network, the present disclosure may also be applied in a case where the client 2 receives the content and the pseudo camera work of the content from another client 2. In this case, the client 2 serves as the information processing device of the present disclosure. Furthermore, in the aforementioned illustrative embodiment, the client 2 may be connected to the storage device 3. In this case, the client 2 plays back the content acquired from the storage device 3. Then, the client 2 displays the video in accordance with the pseudo camera work data acquired from the storage device 3.

What is claimed is:

1. A terminal device comprising:
a display; and
a controller configured to:
display a video on the display in accordance with a display range, the video being configured such that the display range thereof to be displayed on the display within a corresponding one of image frames constituting the video is variable depending on each playback position of the video;
accept an instruction to indicate a specified display range that is a partial display range within a corresponding one of image frames constituting the video displayed on the display; and
acquire particular display range information indicating a particular display range that is within a predetermined distance from the specified display range within an image frame corresponding to a playback position at a point of time when the instruction is accepted, from a storage device storing a plurality of pieces of display range information indicating display ranges to be displayed on the display within respective image frames corresponding to a plurality of playback positions.

2. The terminal device according to claim 1, wherein the controller is further configured to, while the video is displayed on the display, further display, on the display, an image of the particular display range indicated by the particular display range information, based on the corresponding one of the image frames constituting the video displayed on the display.

3. The terminal device according to claim 2, wherein the controller is further configured to, while the video is displayed in a main view of the display, further display, in a sub view of the display, an image of the particular display range indicated by the particular display range information, based on the corresponding one of the image frames constituting the video displayed on the display.

4. The terminal device according to claim 3, wherein the controller is further configured to further display, in the sub view, a video of the particular display range indicated by the particular display range information, as a candidate to be displayed in the main view, based on image frames constituting a video identical to the video being displayed in the main view.

5. An information processing device connectable to a storage device storing a plurality of pieces of display range information of a video, each of the plurality of pieces of display range information indicating a display range to be displayed on a display within a corresponding one of image frames corresponding to a plurality of playback positions of the video, the display range being variable depending on each playback position of the video, the information processing device comprising:
a communication unit; and
a controller configured to:
acquire, from a terminal device via the communication unit, display range information indicating a specified display range that is a partial display range within an image frame corresponding to a playback position at a point of time when an instruction to indicate the specified display range is accepted, the specified display range being the partial display range specified within the image frame of image frames constituting a video displayed by the terminal device;
acquire, from the storage device, particular display range information indicating a particular display range that is within a predetermined distance from the specified display range indicated by the acquired display range information; and
transmit, to the terminal device via the communication unit, the particular display range information.

6. The information processing device according to claim 5, wherein the controller is configured to acquire, from the storage device, the particular display range information such that a distance between a first predetermined point in the specified display range indicated by the acquired display range information and a second predetermined point in the particular display range indicated by the particular display range information stored in the storage device is equal to or less than a threshold.

7. The information processing device according to claim 5, wherein the controller is configured to, when a predetermined condition is satisfied, acquire from the storage device the particular display range information as display range information indicating a display range that satisfies the predetermined condition, the predetermined condition being such that when the image frame is projected on a virtual three-dimensional surface in a three-dimensional virtual space, at least an angle between a first visual line and a second visual line is equal to or less than a threshold, the first visual line being a visual line from a viewpoint in the virtual three-dimensional space to a first predetermined point in the specified display range indicated by the acquired display range information, the second visual line being a visual line from the viewpoint in the virtual three-dimensional space to a second predetermined point in the particular display range indicated by the particular display range information stored in the storage device.

8. A non-transitory computer-readable medium storing computer-readable instructions configured to, when executed by a processor, cause the processor to:
display a video on a display in accordance with a display range, the video being configured such that the display range thereof to be displayed on the display within a corresponding one of image frames constituting the video is variable depending on each playback position of the video;
accept an instruction to indicate a specified display range that is a partial display range within a corresponding one of image frames constituting the video displayed on the display; and
acquire particular display range information indicating a particular display range that is within a predetermined distance from the specified display range within an image frame corresponding to a playback position at a point of time when the instruction is accepted, from a storage device storing a plurality of pieces of display range information indicating display ranges to be displayed on the display within respective image frames corresponding to a plurality of playback positions.

9. The non-transitory computer-readable medium according to claim 8, wherein the instructions are further configured to, when executed by the processor, cause the processor to, while the video is displayed on the display, further display, on the display, an image of the particular display range indicated by the particular display range information, based on the corresponding one of the image frames constituting the video displayed on the display.

10. The non-transitory computer-readable medium according to claim 9, wherein the instructions are further configured to, when executed by the processor, cause the processor to, while the video is displayed in a main view of the display, further display, in a sub view of the display, an image of the particular display range indicated by the particular display range information, based on the corresponding one of the image frames constituting the video displayed on the display.

11. The non-transitory computer-readable medium according to claim 10, wherein the instructions are further configured to, when executed by the processor, cause the processor to further display, in the sub view, a video of the particular display range indicated by the particular display range information, as a candidate to be displayed in the main view, based on image frames constituting a video identical to the video being displayed in the main view.

* * * * *